United States Patent [19]
Nannetti et al.

[11] Patent Number: 6,122,690
[45] Date of Patent: Sep. 19, 2000

[54] ON-CHIP BUS ARCHITECTURE THAT IS BOTH PROCESSOR INDEPENDENT AND SCALABLE

[75] Inventors: Gianni Michele Nannetti, Essex; Tirumal Rao Parvataneni, London, both of United Kingdom

[73] Assignee: Mentor Graphics Corporation, Wilsonville, Oreg.

[21] Appl. No.: 09/062,363

[22] Filed: Apr. 17, 1998

[51] Int. Cl.[7] .................................................. G06F 13/00
[52] U.S. Cl. .......................... 710/102; 710/100; 710/101; 710/126; 710/129; 710/107
[58] Field of Search ................................ 710/102, 29, 34, 710/58, 60, 100, 101, 126, 129, 107, 110; 709/209, 233

[56] References Cited

U.S. PATENT DOCUMENTS

| | | | |
|---|---|---|---|
| 5,678,009 | 10/1997 | Bains et al. ............................... | 710/125 |
| 5,727,171 | 3/1998 | Iachetta, Jr. ............................... | 710/107 |
| 5,740,115 | 4/1998 | Ishibashi et al. ........................ | 365/203 |
| 5,768,628 | 6/1998 | Priem ........................................ | 710/62 |
| 5,911,052 | 6/1999 | Singhal et al. .......................... | 710/113 |

*Primary Examiner*—Ario Etienne
*Attorney, Agent, or Firm*—Blakely Sokoloff Taylor & Zafman, LLP

[57] ABSTRACT

A bus in an integrated circuit uses bus interfaces to couple functional blocks to the bus in a processor independent and scalable manner. Various embodiments of the bus interfaces include a bus interface for a bus master functional block, a bus interface for a slave functional block, and a bus interface for either a bus master functional block or a slave functional block. Each bus interface includes a state machine that has at least two operational modes including a fast operational mode having two states and a normal operational mode having at least four states. A bus interface coupled to a bus master functional block implements an operational mode and a bus interface coupled to a slave functional block operates in a complementary operational mode. Each bus interface is also equipped to facilitate scaling of the address and/or data width on the bus. Various embodiments of the bus interfaces are also equipped to support multiple bus masters, broadcast writes, burst mode transfers, and/or tri-states on the bus.

32 Claims, 26 Drawing Sheets

FIG. 4

| NAME | M/S | I/O | DESCRIPTION |
|---|---|---|---|
| RESET | MASTER AND SLAVE | IN | ACTIVE LOW RESET SIGNAL. FORCES INTERFACE TO RESET CONDITION. |
| FAST | MASTER | IN | ACTIVE LOW MODE SIGNAL TO ENABLE FAST TWO CYCLE BUS ACCESSES, ASSERTED AT THE P0 STATE. |
| START | MASTER | IN | ACTIVE LOW START MASTER BUS CYCLE SIGNAL. IGNORED BY THE SLAVE. |

FIG. 5

| NAME | M/S | I/O | DESCRIPTION |
|---|---|---|---|
| WAIT | MASTER AND SLAVE | IN CTRL LINE | ACTIVE LOW SIGNAL INDICATING THE MODULE REQUIRES MORE THAN 4 CYCLES FOR AN ACCESS. WAIT CYCLES ARE INSERTED WHILE THIS SIGNAL IS ACTIVE. NOTE: THIS SIGNAL IS INTERNALLY LATCHED AND TAKES 1 CLOCK TO TAKE EFFECT, THEREFORE, IT IS FIRST ASSERTED WHILE IN THE P0 STATE. |
| RWI | MASTER AND SLAVE | IN FROM BUS (S) IN CTRL LINE (M) | READ/WRITE LINE. A HIGH INDICATES A READ CYCLE AND LOW A WRITE OPERATION. WHEN IN MASTER MODE THIS LINE INDICATES THE TYPE OF ACCESS REQUIRED. WHEN IN SLAVE MODE THIS LINE INDICATES TYPE OF ACCESS IN PROGRESS. |
| CS_B | SLAVE | IN FROM BUS (S) | ACTIVE LOW CHIP SELECT SIGNAL THAT INDICATES THAT THE CURRENT ACCESS IS FOR THIS MODULE. |
| RI_B | MASTER AND SLAVE | IN FROM BUS (M) IN FROM BUS (S) | ACTIVE LOW READY IN HANDSHAKE SIGNAL. TO A MASTER A LOW INPUT INDICATES THAT THE TARGET SLAVE IS READY. TO A SLAVE AN ACTIVE LOW INDICATES THAT THE MASTER IS READY. A SIMULTANEOUS LOW ON THIS SIGNAL AND THE CS_B INDICATES A FAST ACCESS TO A SLAVE. |
| RO_B | MASTER AND SLAVE | OUT TO BUS | ACTIVE LOW READY OUT HANDSHAKE SIGNAL. THE RO_B FROM THE ACTIVE MASTER IS ROUTED TO ALL SLAVES AS THE SLAVE RI_B. THE OUTPUT FROM ALL SLAVES ARE ANDED TOGETHER AND RETURNED TO THE MASTER AS ITS RI_B. |
| CA_B | MASTER | OUT TO BUS | ACTIVE LOW CYCLE ACTIVE SIGNAL INDICATES AN ACTIVE CYCLE IS IN PROGRESS. THE MASTER GENERATED SIGNAL IS CONNECTED TO THE APPROPRIATE SLAVE AFTER DECODING THE SLAVES BASE ADDRESS. |
| EOCYCLE | MASTER AND SLAVE | OUT | ACTIVE LOW END OF CYCLE INDICATION. I.E. STATE MACHINE IS IN P3 |
| IDLE_CYCLE | MASTER AND SLAVE | OUT | ACTIVE LOW IDLE CYCLE INDICATION. I.E. STATE MACHINE IS IN P0. |

FIG. 6

| NAME | M/S | I/O | DESCRIPTION |
|---|---|---|---|
| RD_EARLY_B | SLAVE | OUT | ACTIVE LOW STROBE INDICATING AN EARLY READ CAN TAKE PLACE. USED TO ACTIVATE AN ACTION BEFORE A READ. NOT SUPPORTED IN FAST MODE. |
| WR_EARLY_B | SLAVE | OUT | ACTIVE LOW STROBE INDICATING AN EARLY WRITE CAN TAKE PLACE. USED TO ACTIVATE AN ACTION BEFORE A WRITE. NOT SUPPORTED IN FAST MODE. |
| RD_CLR_B | SLAVE | OUT | ACTIVE LOW STROBE INDICATING AN LATE READ CAN TAKE PLACE. USED TO ACTIVATE AN ACTION AFTER A READ OR TO CLEAR THE DATA AFTER A READ. NOT SUPPORTED IN FAST MODE. |
| RD_STB_B | SLAVE | OUT | ACTIVE LOW STROBE INDICATING A READ IS TAKING PLACE. THIS IS THE NORMAL READ STROBE. |
| WR_STB_B | SLAVE | OUT | ACTIVE LOW STROBE INDICATING A WRITE CAN TAKE PLACE. THIS IS THE NORMAL WRITE STROBE POSITION. |

FIG. 15

| ADDITIONAL FUSP*BUS* SIGNALS | | |
|---|---|---|
| NAME | SIZE | DESCRIPTION |
| MMG | 1 | ACTIVE LOW MASTER MODE GRANT SIGNAL. THIS SIGNAL ORIGINATES IN THE FISP*BUS* ARBITER AND STARTS THE MASTER OPERATION. (SEE THE SECTION ON BUS ARBITER FOR FURTHER DETAILS) |
| MMR | 1 | ACTIVE HIGH MASTER MODE REQUEST SIGNAL. THIS SIGNAL REQUESTS BUS OWNERSHIP FROM THE FISP*BUS* ARBITER AND OWNERSHIP IS GRANTED BY MMG. (SEE THE SECTION ON BUS ARBITRATION FOR FURTHER DETAILS) |
| CA_B | NUMBER OF BYTES IN DATA WIDTH + 1 | OUTPUT BUS OF ACTIVE LOW "CHIP SELECTS". BIT 0 IS THE AND OF ALL CHIP SELECTS WITH BIT 1 TO N INDICATING INDIVIDUAL BYTE SELECTS WITH BIT 1 CORRESPONDING TO THE LSB AND BIT N CORRESPONDING TO THE MSB. (SEE SECTION ON BYTE ALIGNMENT FOR FUTHER DETAILS) |

FIG. 16

| | | ADDITIONAL FISP*BUS* SIGNALS |
|---|---|---|
| NAME | SIZE DENOTED | DESCRIPTION |
| AI | FISP*BUS* ADDRESS WIDTH | ADDRESS IN FROM THE CURRENT MASTER. THE MINIMUM SIZE OF THIS BUS IS DETERMINED BY THE MAXIMUM ADDRESS RANGE REQUIRED BY THE SLAVES ON THE BUS. THE CURRENT MASTER IS DETERMINED BY THE BUS ARBITER. |
| CS_B | NUMBER OF BYTES IN DATA WIDTH + 1 | BUS OF ACTIVE LOW "CHIP SELECTS." BIT 0 IS THE AND OF ALL CHIP SELECTS WITH BIT 1 TO N INDICATING INDIVIDUAL BYTE SELECTS WITH BIT 1 CORRESPONDING TO THE LSB AND BIT N CORRESPONDING TO THE MSB. (SEE SECTION ON BYTE ALIGNMENT FOR FURTHER DETAILS) |
| FTS | 1 | ACTIVE LOW FREE TO SEND SIGNAL. A LOW ON THIS SIGNAL WILL INDICATE TO THE ARBITER THAT THE SLAVE HAS DATA TO BE READ. REMOVAL OF THIS SIGNAL MUST TAKE PLACE WITHIN P0 BEFORE ANY TRANSITION TO THE NEXT STATE. USE OF THIS SIGNAL IS NOT MANDATORY. (SEE THE SECTION ON BUS ARBITRATION FOR FURTHER DETAILS) |
| FTR | 1 | ACTIVE HIGH FREE TO RECEIVE SIGNAL. A HIGH ON THIS SIGNAL WILL INDICATE TO THE ARBITER THAT THE SLAVE HAS ROOM TO RECEIVE DATA. REMOVAL OF THE SIGNAL MUST TAKE PLACE WITHIN P0 BEFORE ANY TRANSITION TO THE NEXT STATE. USE OF THIS SIGNAL IS NOT MANDATORY. (SEE THE SECTION ON BUS ARBITRATION FOR FURTHER DETAILS) |
| IG | NUMBER OF INTERRUPTS IN MODULE + 1 | ACTIVE LOW INTERRUPT GRANT LINES. BIT 0 IS THE AND OF ALL INTERRUPT GRANTS TO THIS MODULE AND BITS 1-N ARE INDIVIDUAL GRANTS FOR EACH INTERRUPT WITHIN THE BLOCK. SUPPORT OF INTERRUPT GRANTS BEYOND 0 IS NOT MANDATORY AND IS ONLY REQUIRED FOR VECTORED INTERRUPTS. (SEE THE SECTION ON HANDLING INTERRUPTS FOR FURTHER DETAILS) |
| DO | FISP*BUS* DATA WIDTH | DATA OUT FROM THE SLAVE. THE MINIMUM SIZE OF THIS BUS IS DETERMINED BY THE MAXIMUM DATA RANGE REQUIRED BY THE SLAVES ON THE BUS. THE DATA OUT FROM EACH SLAVE MODULE IS MULTIPLEXED BY THE BUS ARBITER TO CREATE THE COMMON FISP*BUS* DATA BUS. |
| DI | FISP*BUS* DATA WIDTH | DATA IN FROM THE MASTER. THE MINIMUM SIZE OF THIS BUS IS DETERMINED BY THE MAXIMUM DATA RANGE REQUIRED BY THE SLAVES ON THE BUS. THIS IS THE COMMON FISP*BUS* DATA BUS. |
| IR | NUMBER OF INTERRUPTS IN MODULE + 1 | ACTIVE LOW INTERRUPT REQUEST LINES. BIT 0 IS THE AND OF ALL INTERRUPT REQUESTS FROM THIS MODULE AND BITS 1-N ARE INDIVIDUAL REQUESTS FOR EACH INTERRUPT WITHIN THE BLOCK. SUPPORT OF INTERRUPT REQUESTS BEYOND 0 IS NOT MANDATORY AND IS ONLY REQUIRED FOR VECTORED INTERRUPTS. (SEE THE SECTION ON HANDLING INTERRUPTS FOR FURTHER DETAILS) |

ON-CHIP BUS ARCHITECTURE THAT IS BOTH PROCESSOR INDEPENDENT AND SCALABLE

BACKGROUND OF THE INVENTION

1. Field of the Invention

The present invention relates to the field of integrated circuits (IC). More specifically, the present invention relates to on-chip bus.

2. Background Information

Computer system designers have long recognized the benefits of having standardized system buses. Examples of such buses include the S-bus developed by Sun Microsystems of Mountain View, CA for SPARC based workstations, and Peripheral Component Interface (PCI) bus developed by the PCI Special Interest Group (SIG) of Hillsboro, OR, for Intel Architecture based personal computers. In each of these cases, the existence of a standardized system bus enables numerous interoperable peripherals to be developed by different manufacturers, enriching the functionality and choices available for the system purchasers.

However, the practice has not been adopted by microprocessor or application specific integrated circuit (ASIC) designers. Virtually all on-chip buses known in the art are proprietary, and intended for a specific processor or ASIC family. As time-to-market become increasingly critical, more and more on-chip function blocks are designed for multiple processor and/or ASIC families. Thus, a need exists for a scalable processor independent bus.

SUMMARY OF THE INVENTION

A scalable processor independent bus is disclosed. In accordance with one aspect of the present invention, each bus master function block is provided with a bus master interface having a state machine that implements at least two operational modes, including a two state fast mode, and an at least four state normal mode. In accordance with another aspect of the present invention, each bus slave function block is likewise provided with a bus slave interface having a state machine that implements the two operational modes in a complementary manner. In accordance with yet another aspect of the present invention, each bus master/slave function block is provided with a bus master/slave interface having a state machine that implements the at least two operational modes in the role of a bus master as well as in the role of a bus slave.

In accordance with yet another aspect of the present invention, in various embodiments of the present invention, each bus master, slave, or master/slave interface is equipped to facilitate scaling of the address as well as data width. Additionally, the bus is equipped to support multiple masters on the bus, broadcast writes, burst mode transfers, and/or tri-states.

BRIEF DESCRIPTION OF DRAWINGS

The present invention will be described by way of exemplary embodiments, but not limitations, illustrated in the accompanying drawings in which like references denote similar elements, and in which:

FIGS. 4–6 summarize the basic control signals for facilitating bus transactions;

FIGS. 15–16 summarize additional control signals, including those for facilitating scaling of address and data width;

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Figure 1:
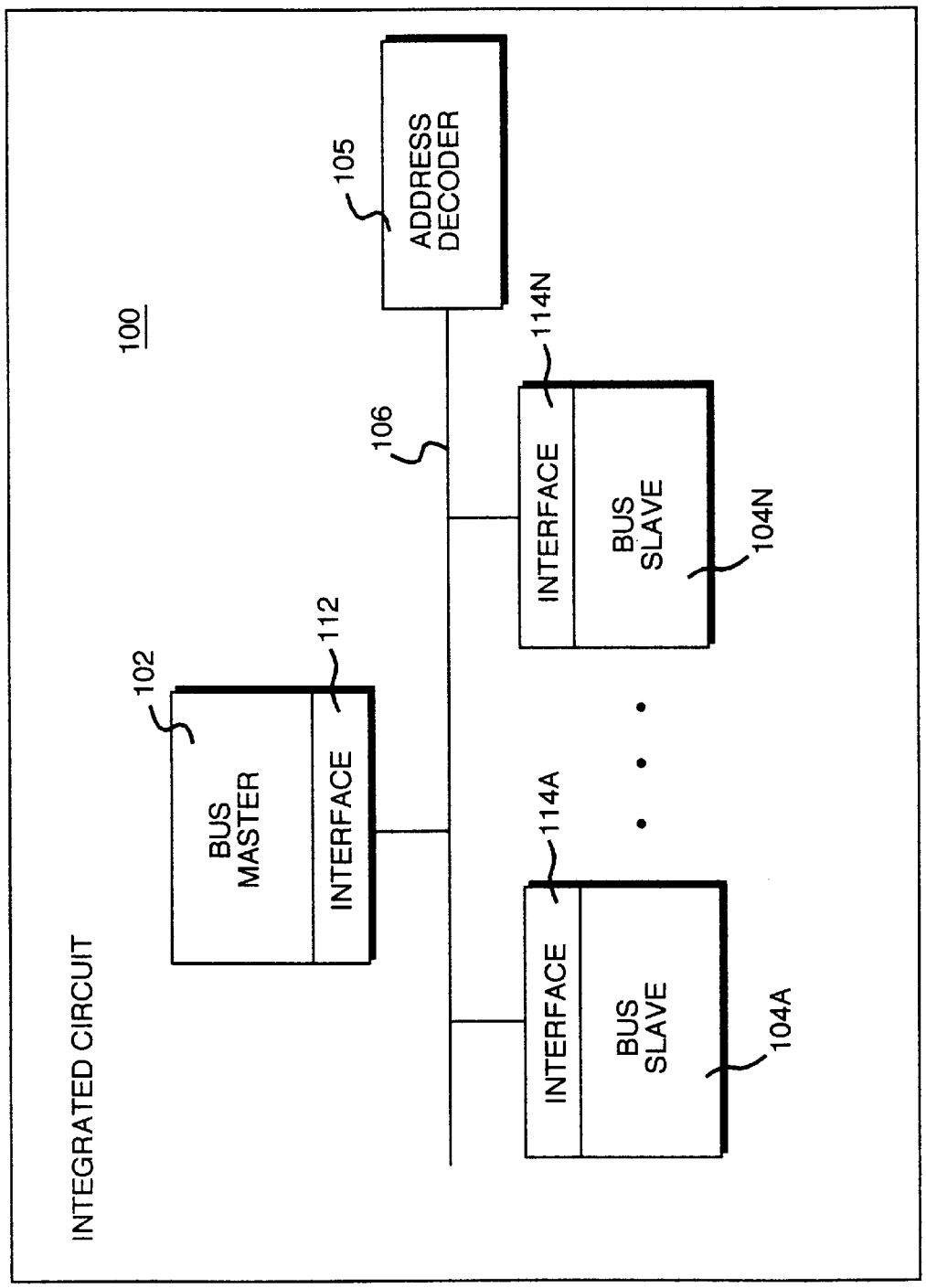
FIG. 1 illustrates an integrated circuit incorporated with a basic configuration of the present invention.

Referring now FIG. 1, wherein a block diagram illustrating an exemplary integrated circuit incorporated with a basic configuration of the present invention is shown. As illustrated, exemplary integrated circuit 100 includes a bus master functional block 102, a number of bus slave functional blocks 104a, . . . 104n, and the bus itself 106, coupled to each other via address decoder 105 as shown. Bus master functional block 102 is equipped with bus master interface 112 incorporated with the teachings of the present invention. Similarly, each bus slave functional block 104a, . . . or 104n is equipped with a bus slave interface 114 incorporated with the teachings of the present invention. Bus master interface 112 and each bus slave interface 114 interact with each other on behalf of their respective host functional blocks 102, 104a, . . . and 104n in accordance with the teachings of the present invention, thereby enabling bus transactions to be conducted among functional blocks 102, 104a, . . . and 104n in a processor independent manner. Furthermore, by virtue of the teachings of the present invention incorporated, address and data width may be scaled for different implementations of IC 100.

Figure 2:
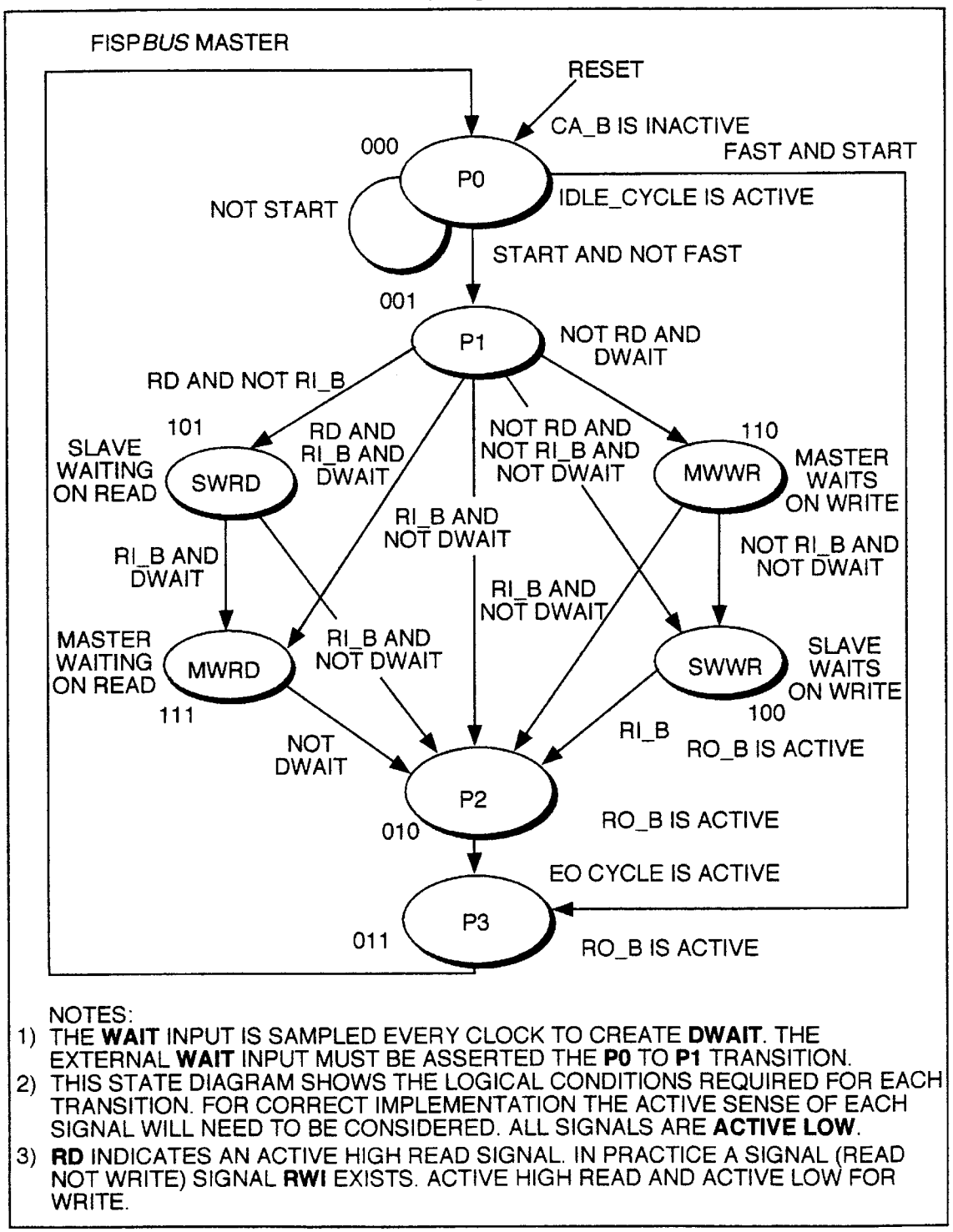
FIGS. 2–3 illustrates one embodiment each of the operational states and transitional rules of the state machine incorporated in the bus master and the bus slave interface respectively.
Figure 3:
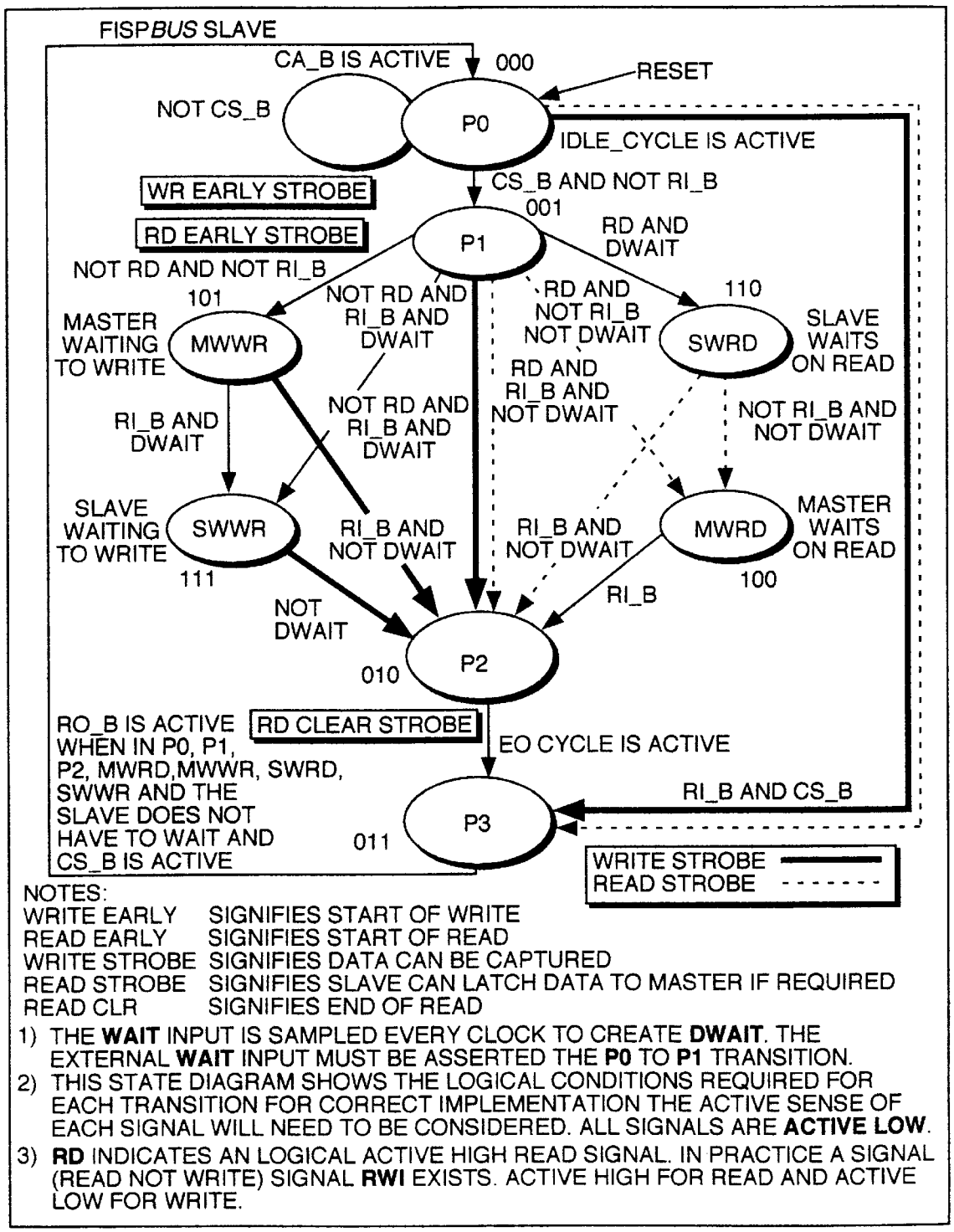

In accordance with the teachings of the present invention, each bus master/slave interface 102, 104a, . . . or 104n is equipped with a state machine that conducts the bus transactions on behalf of its interface' host functional block in the role of a bus master/slave. Each state machine supports at least two modes of operations, a two state fast mode, and an at least four state normal mode. At any point in time, the bus master functional block may address one or many bus slave functional blocks, depending on the address accessed. FIGS. 2–3 illustrate the states and the transitional rules implemented by the state machine provided to bus master interface 102, and each of bus slave interface 104*a*, . . . or 104*n* respectively. FIGS. 4–6 summarize the basic control signals employed to facilitate conduct of bus transactions.

As shown in FIG. 2, on RESET the state machine provided to master interface 102 is in the P0 (idle) state. To initiate a cycle, the mode of the required cycle is set using the FAST signal. Once the START signal is asserted, an access cycle begins. The RWI line is driven to indicate the type of access that is required. If the Master is expecting to lengthen the access cycle (for example to ensure that data is held longer on the bus, or if bridging from an asynchronous domain and additional cycles are required to ensure that the data is ready before the actual write operation) then the WAIT line is also held active. The WAIT line is sampled on the rising edge of every clock to create the DWAIT signal.

Once the state machine has seen an active START signal, the access cycle begins. In FAST mode the bus will ignore any WAIT requests (from both the Master and Slave) and directly transition to state P3 (end of cycle). The EOCycle signal will be asserted and on the next clock, the state machine transitions back to P0, and asserts the IDLE_Cycle signal. The transition to state P3 causes both the CA_B and the RO_B signals to go active simultaneously. These signals are connected to the CS_B and RI_B inputs of the bus slave interface, and indicates to the bus slave that a FAST access is in progress. When not in FAST mode, the state machine transitions to state P1 (wait/readiness determination), and the CA_B signal goes active without the ready out (RO_B).

In state P1, the bus master will examine the ready in signal (RI_B) from the bus slave, and the generated delayed wait (DWAIT. If the bus master is not expected to wait and the bus slave is ready, the state machine transitions to state P2. If the bus slave is not ready, and the bus operation is a read operation, the state machine transitions to SWRD (Slave Waiting on Read). If the bus operation is a write operation, and the bus master needs additional cycles, the state machines transitions to MWWR (Master Waiting on Write). If the bus operation is a read operation, and the bus slave is ready, but the bus master requires extra cycles (WAIT asserted), the state machine will transition to MWRD (Master Waiting on Read). Finally if the bus operation is a write operation, the bus slave is not ready, and the bus master does not require additional cycles, the state machine transitions to SWWR (Slave Waits on Write).

If the bus slave is holding the bus up on a read (state SWRD) when the ready from the bus slave (RI_B) is active, the state machine transitions to P2 if the bus master does not require any additional waits, and transitions to MWRD (Master Waiting on Read) if the bus master needs more cycles. If the bus master is not yet ready to write, the state machine transitions to the MWWR (Master Waiting on Writes) state. If the bus master waiting requirement completes, the next state is SWWR (Slave Waiting on Writes), unless the bus slave is also ready. In this case, the next state will be state P2 (ready).

Once all waits by the bus master and bus slave are satisfied, the Master is in the P2 state. In all states where the bus master is ready (i.e. SWWR, P2 and P3), the RO_B line is set to active. This will let the corresponding bus slave know that the bus master is ready. Finally the state machine transitions from state P2 to state P3 on the next clock, and from state P3 to state P0 to complete the access cycle. While in the P3 State, the bus master state machine asserts EO_Cycle to indicate that the access cycle is complete. In one embodiment, this signal is used to latch data that is read from the bus slave.

With no wait states, a normal mode access cycle will take 4 clocks and a fast mode access will take 2 clocks. In the normal mode, both the bus master and the bus slave are allowed to insert a variable number of wait states. The bus master is also allowed to switch between the normal and the fast mode during IDLE times (i.e. state P0).

Referring now to FIG. 3, on RESET, the state machine provided to a bus slave interface is in the P0 state. The bus slave will wait in this idle condition until the CS_B from the bus master (Master output CA_B) goes active. If the ready in line (RI_B) from the bus master (Master output RO_B) is also active when CS_B is active, the bus slave knows that this is a fast mode access. Accordingly, the state machine transitions directly to state P3. This transition causes an assertion of either the RD_Stb_B or the WR_Stb_B strobes, depending on the polarity of the read/write (RWI) line. It should be noted that in fast mode, the bus master ignores the bus slave's ready line, and therefore the cycle will complete in 2 clock cycles, regardless of the bus slave's actual state.

If the chip select line (CS_B) is detected active by the bus master with the ready line (RI_B) inactive, the bus slave will start a normal 4+ cycle by changing to the P1 State. While the CS_B is asserted, the address and RWI line from the bus master are also stable. The bus slave uses this information to determine whether it can service the access. If it requires additional cycles to complete the operation, it will not assert the ready out (RO_B) line. This is controlled by use of the bus slave's WAIT line (which is reclocked to generate DWAIT). The Wait line is asserted prior to the transition to state P1, and the bus slave continues to insert waits until the WAIT line is deasserted. The handshake between the ready sent by the bus master and the ready sent by the bus slave determines the length of the access. The transition to state P1 generates two strobes (RD_EARLY and WR_EARLY) which are in turn used to initiate operations prior to actual reception or sending of data. A typical example is using the RD_EARLY strobe to update an interrupt service status prior to dispatching the interrupt status to a microprocessor on chip.

Once in the P1 state, the next transition is determined by the state of readiness of the bus slave and the bus master. In a non-broadcast scenario if both the bus slave and bus master are ready (determined by DWAIT and RI_B), the state machine changes to the P2 state, and asserts the appropriate read (RD_Stb_B) or write (WR_Stb_B) strobe. If the bus master is reading, and not ready while the bus slave does not require additional WAIT states, the bus slave transitions to state MWRD (Master Waiting on Read). The transition causes the assertion of the read (RD_Stb_B) strobe. During a read, if the bus master is ready, and the bus slave requires additional WAIT states (DWAIT active), the bus slave transitions to state SWRD (Slave Waiting on Read). Similarly in the case where the bus master is writing, the state machine changes to the MWWR (Master Waiting to Write) state if the bus master is not ready, and to the SWWR (Slave Waiting to Write) state if the bus master is ready when the bus slave needs more time.

In Broadcast writes, the ready outs all the bus slaves are combined with the Master ready out signal to create a new composite ready in (RI_B) to all the bus slaves. This signal is only active when all bus slaves and the bus master are ready. Any bus slave that is faster than the slowest bus slave assumes that the bus master is slow and waits. This ensures that the bus slaves correctly handle broadcast writes, and the length of the access is determined by the slowest bus slave.

When the bus slave is in the MWWR (Master Waiting to Write) state, the bus slave waits until the ready in (RI_B)

line goes active. If additional waits states are required by the bus slave, the bus slave goes to the SWWR (Slave Waiting to Write) state. If no additional waits are required when the ready in is active, the state machine transitions to state P2, and asserts the WR_Stb_B strobe. Similarly, if the state machine is in the SWWR state, and the bus slave waits are complete, the state machine transitions to state P2, and asserts the WR_Stb_B strobe.

When the bus slave is in the SWRD (Slave Waiting on Read) state, the bus slave waits until the DWAIT line goes inactive. If the bus master is not ready by this time, the bus slave goes to the MWRD (Master Waiting on Read) state, and asserts the read strobe (RD_Stb_B) signal. If the bus master is ready (signified by RI_B being active) and DWAIT is inactive, the bus slave transitions to state P2, and asserts the RD_Stb_B strobe. From the MWRD state, the bus slave waits for the bus master to be ready before transitioning to the P2 state.

When reading in the P2 state, at the next clock, the state machine transitions to the P3 state, and asserts the read clear strobe (RD_Clr_B). While in P3 state, the state machine asserts the EO_Cycle. At the next and final clock, the state machine returns to state P0, i.e. the IDLE condition.

Before we continue with the description, it should be note that in fast mode, no facility to delay an access is provided. It is the bus master's responsibility to know that the bus slaves accessed in the fast mode, fully supports fast mode accesses. Thus, functional blocks supporting only a subset of accesses at the fast rate must clearly identify these addresses. It is the responsibility of the system designer then to ensure that these operations are possible.

Additionally, in practice, the bus master and the bus slave interfaces are provided with the same state machine, the state machine can switch between acting as a bus master state machine or a bus slave state machine in state P0. In other words, it is possible for a functional block to be a bus master in one point in time, and a bus slave in another point in time.

Figure 7:
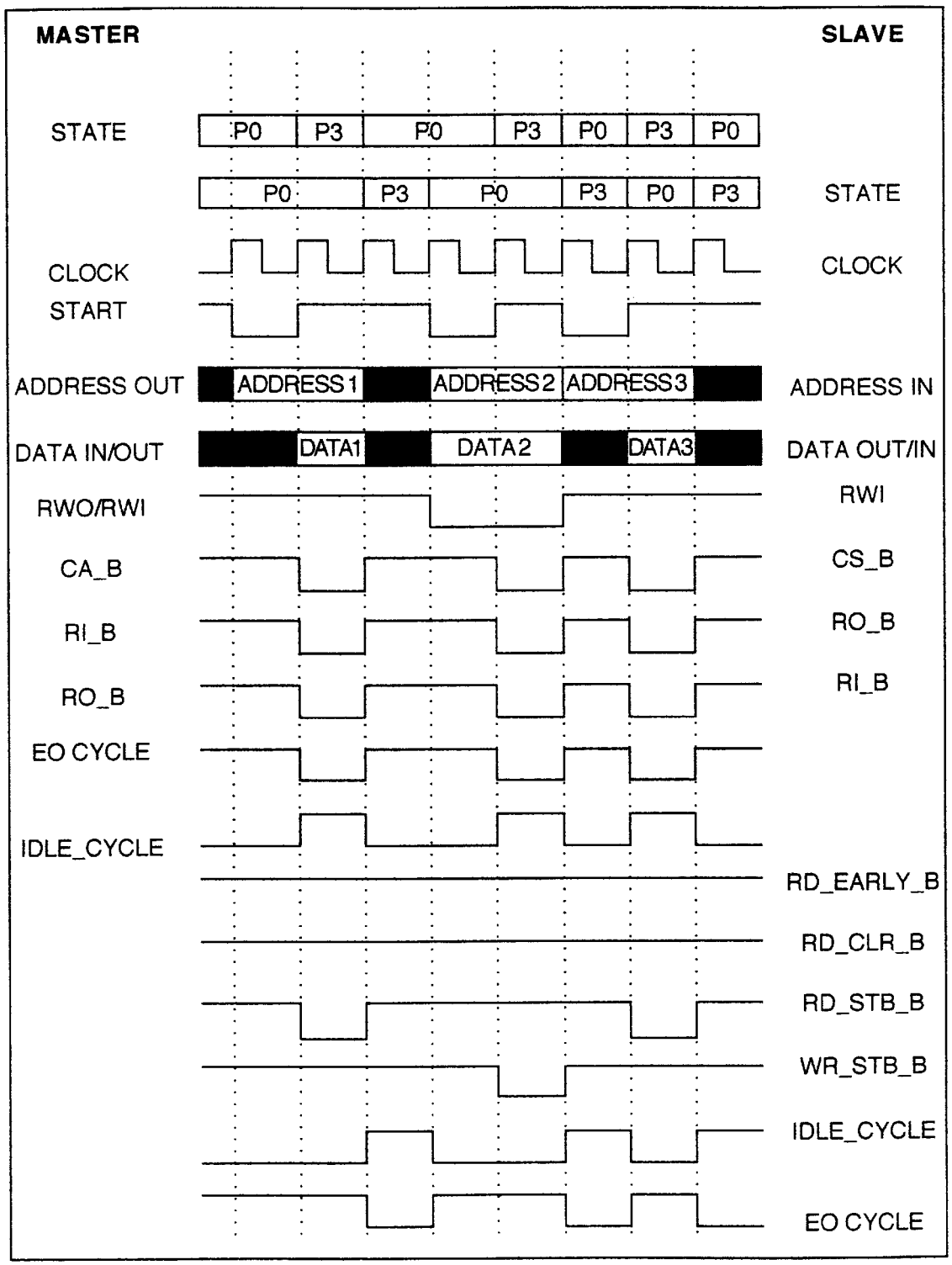
FIGS. 7–14 are timing diagrams illustrating signal timings for read/write operations between a fast/slow bus master and a fast/slow bus slave.
Figure 8:
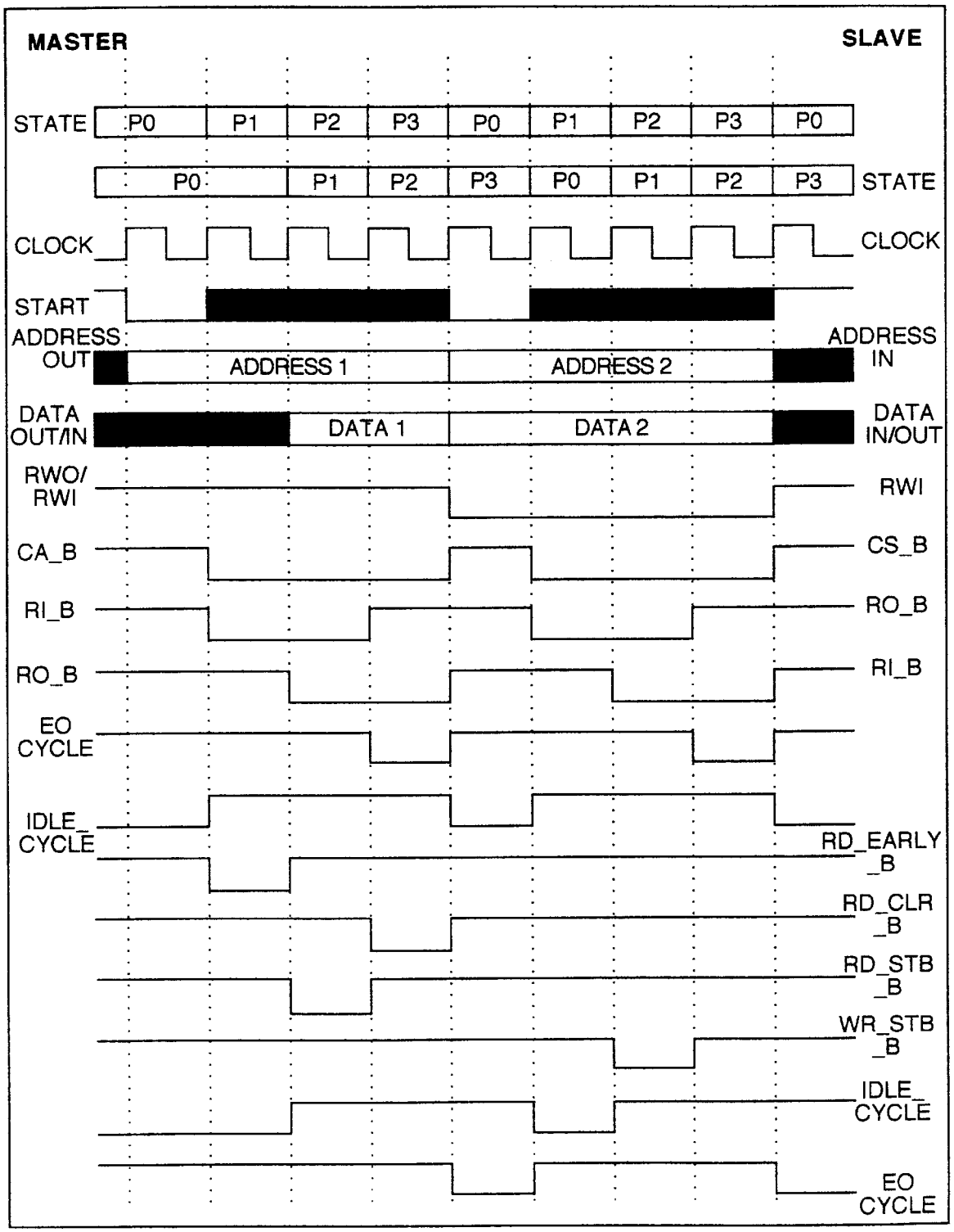
Figure 9:
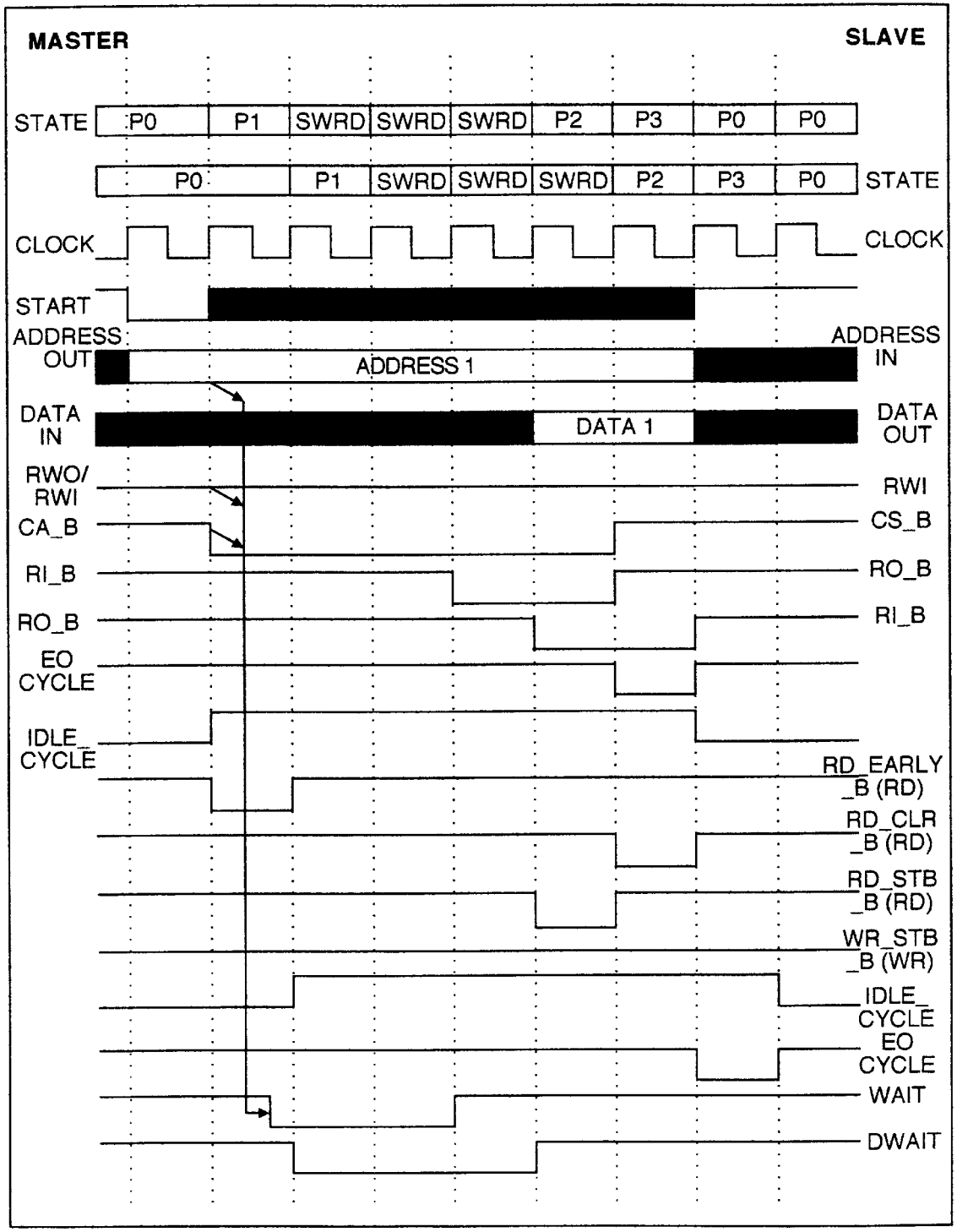
Figure 10:
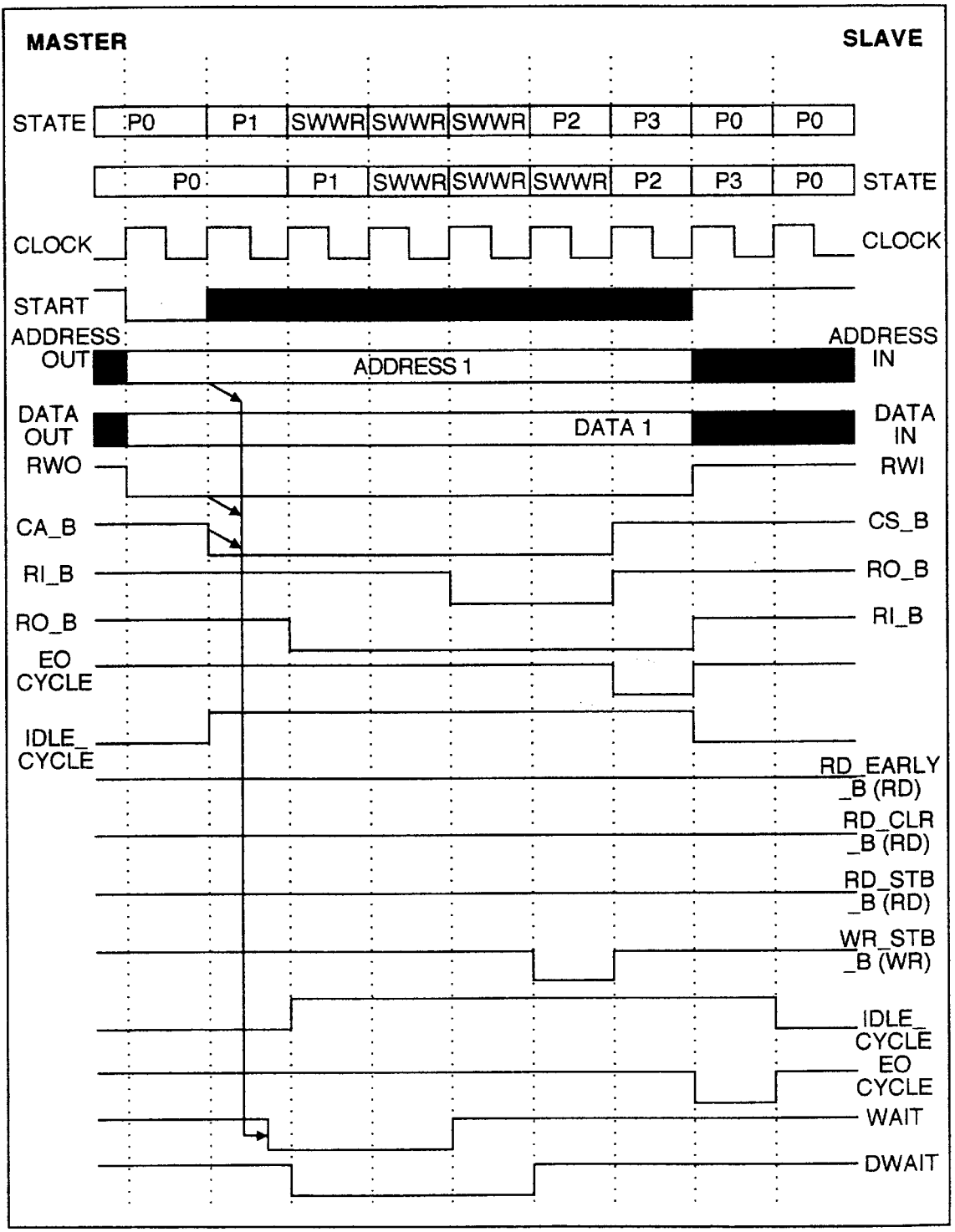
Figure 11:
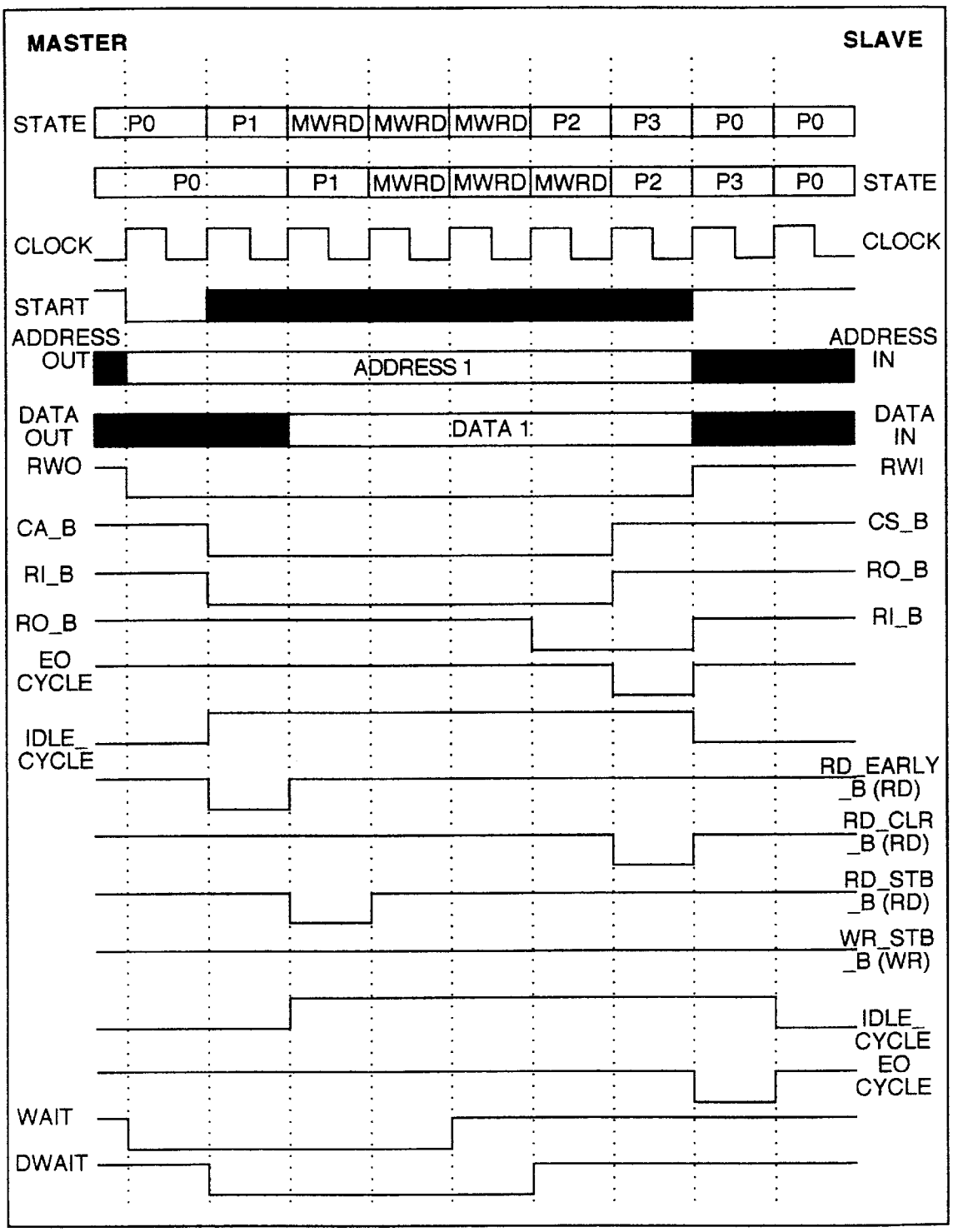
Figure 12:
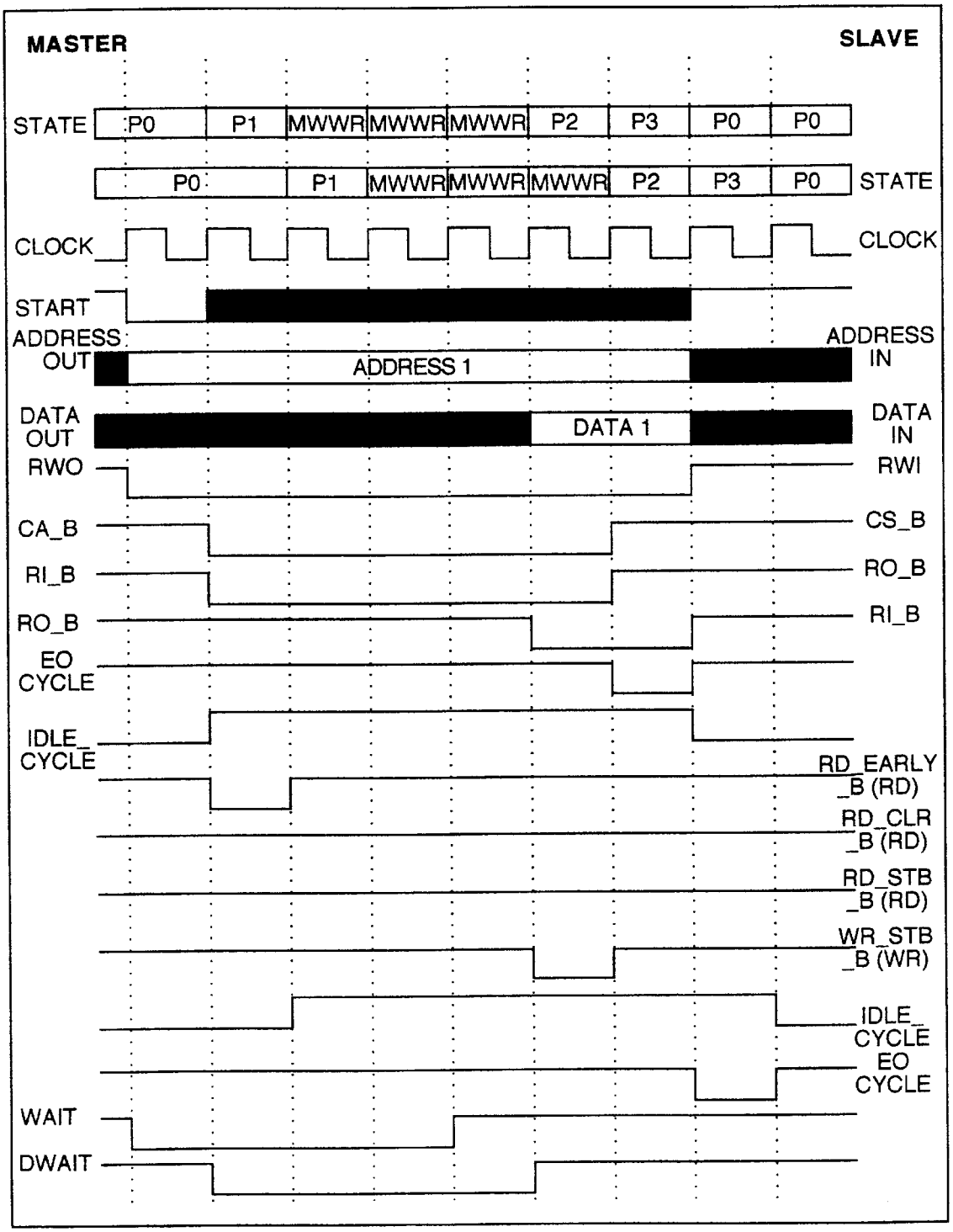
Figure 13:
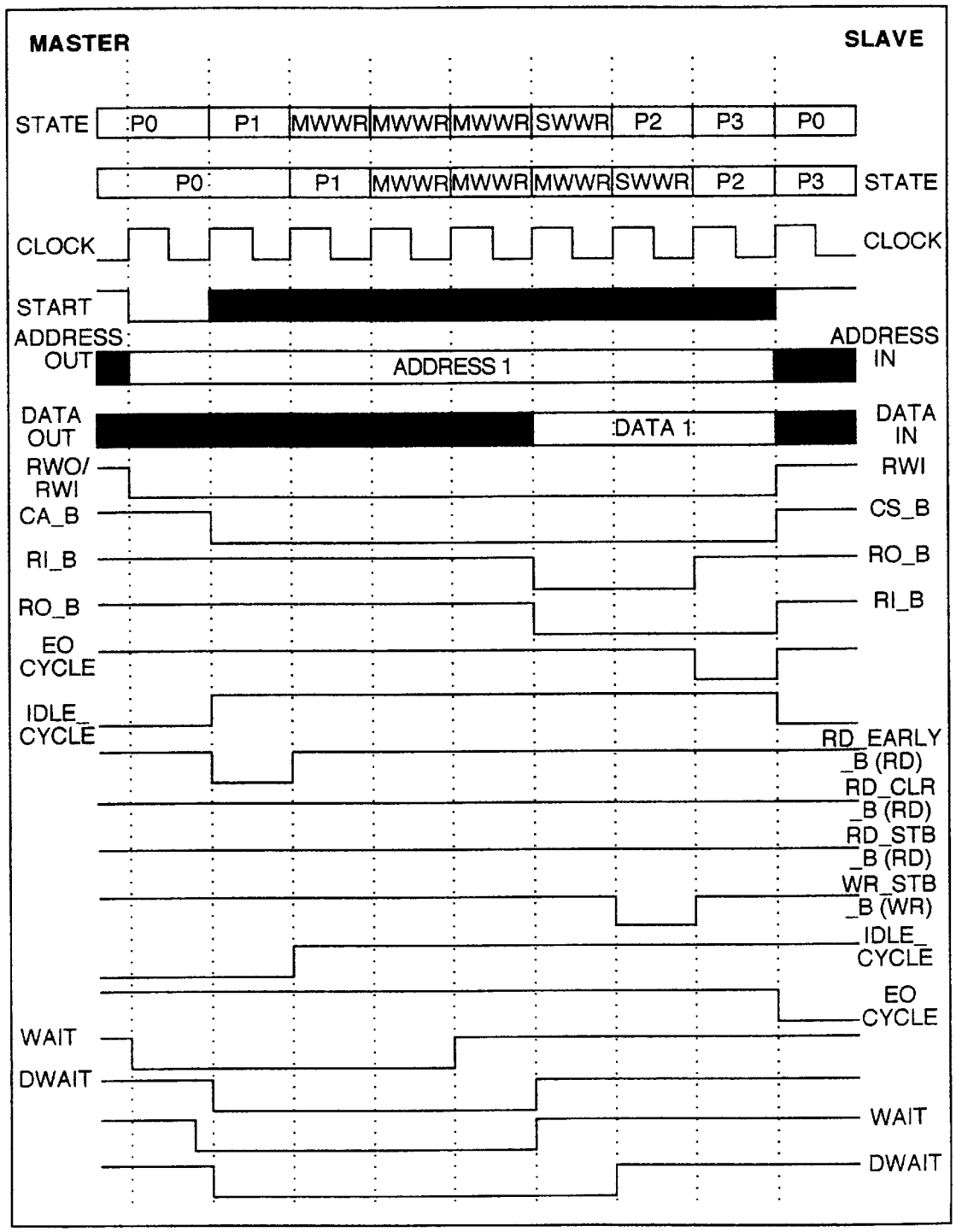
Figure 14:
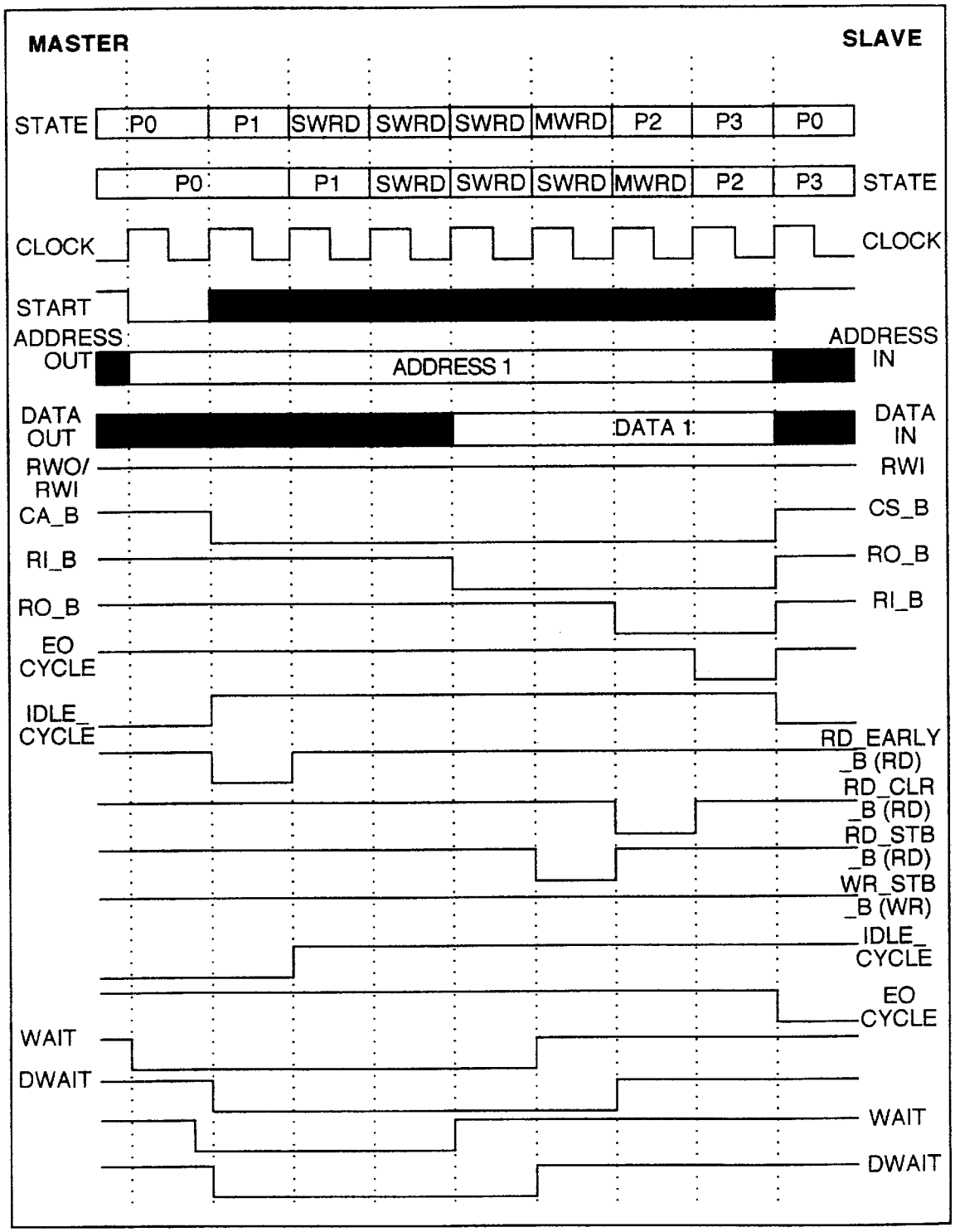

FIGS. 7–14 illustrate signal timings for read/write operations between a fast/slow bus master and a fast/slow bus slave. More specifically, FIG. 7 illustrates the timing of the above described signals, when a bus master using the two state fast mode to perform either a read or a write operation against a bus slave. FIG. 8 illustrates the timing of the above described signals, when a non-waiting bus master using the at least four state normal mode to perform either a read or a write operation against a non-waiting bus slave. The read/write operation is completed in four cycles, without using any wait states. FIGS. 9–10 illustrate the timing of the above described signals, when a fast bus master using the at least four state mode to perform a read and a write operation respectively against a slow bus slave. Three wait states are employed. The required period of wait is determined by the length of the bus slave's WAIT line. FIGS. 11–12 illustrate the timing of the above described signals, when a slow bus master using the at least four state mode to perform a read and a write operation respectively against a fast bus slave. Again, three wait states are employed. The required period of wait is determined by the length of the bus master's WAIT line. Finally, FIGS. 13–14 illustrate the timing of the above described signals, when a slow bus master using the at least four state mode to perform a write and a read operation respectively against a slow bus slave. In FIG. 13, the bus master required 3 wait states, while the bus slave required 4 wait states. In FIG. 14, the bus master required 4 wait states, while the bus slave required 3 wait states instead.

Referring now to FIGS. 15–16, wherein additional control signals, including those for facilitating scaling of address and data width are summarized. As shown, these additional control signals include control signals master mode grant (MMG) and master mode request (MMR) for supporting bus grant and bus request, control signals CS_B and CA_B for chip-select, and control signals FTS and FTR for denoting a "free state" to send and receive signal. Furthermore, these control signals include control signal AI for denoting the maximum address range required by the bus slave functional blocks, and control signals DO and DI for denoting the maximum data range required by the bus slaves on the bus. Finally, in some embodiment, the additional control signals also include IG and IR for supporting interrupt handling (to be described more fully below).

Figure 17:
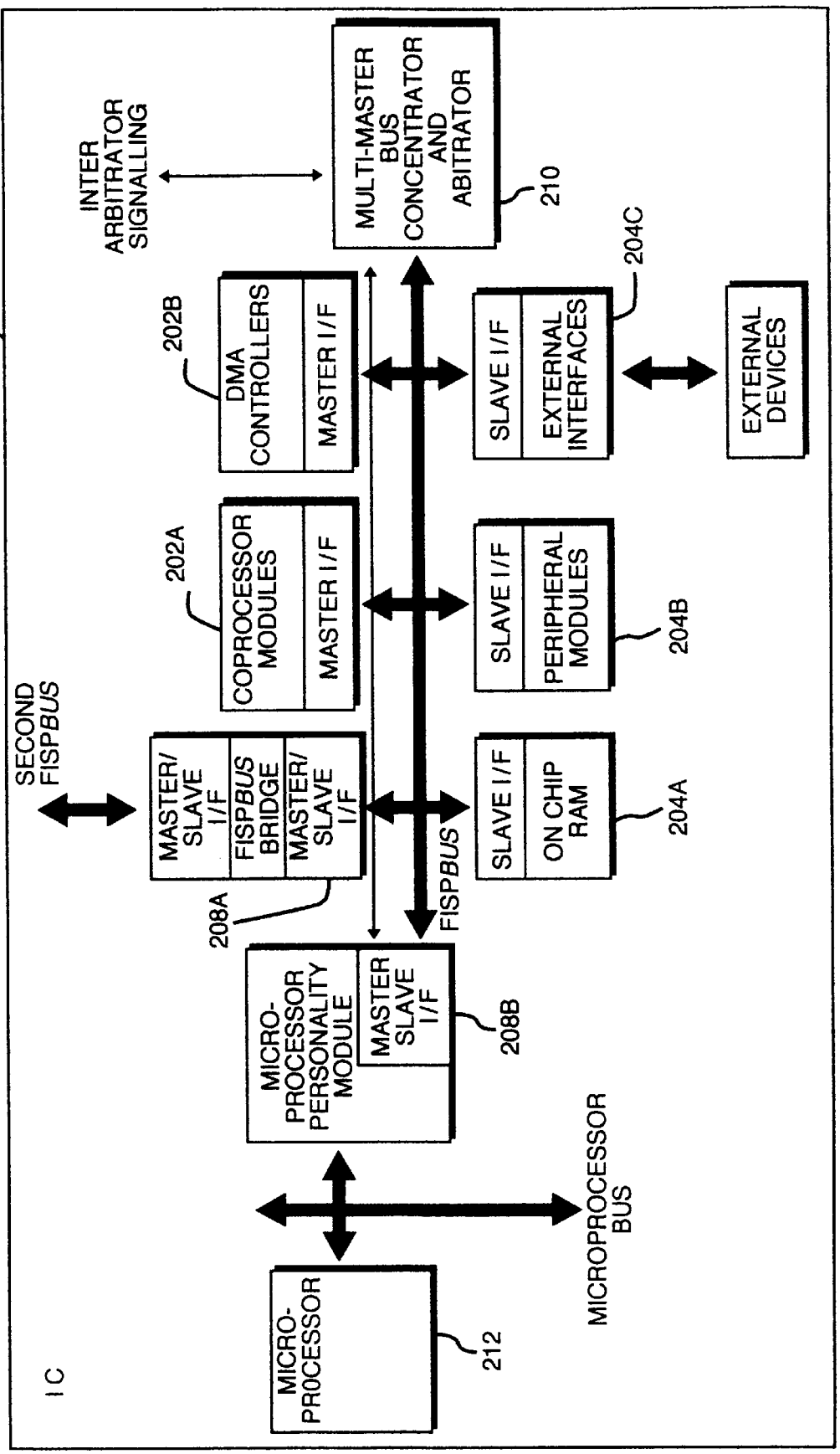
FIG. 17 illustrates another exemplary integrated circuit incorporated with a more complex configuration of the present invention.

Referring now to FIG. 17, wherein a block diagram illustrating another exemplary integrated circuit incorporated with a more complex configuration of the present invention is shown. As shown, exemplary integrated circuit 200 includes multiple bus master functional blocks 202a–202b as well as multiple slave functional blocks 204a–204c. Additionally, exemplary integrated circuit 200 includes multiple bus master/slave functional blocks 208a–208b, i.e. these functional blocks may be bus masters in certain points in time, and bus slaves in other points in time. One of these exemplary bus master/slave functional block is bus bridge 208a for bridging to another scalable processor independent bus of the present invention. Another one of these exemplary bus master/slave functional block is processor personality module 208b where mapping to the unique requirements for processor 212 is handled. Lastly, with the presence of multiple bus master functional blocks, exemplary integrated circuit 200 also includes bus arbitrator 210. These elements are coupled to each other as shown. As described earlier, each of the bus master, bus slave and bus master/slave functional blocks is provided with a bus master, a bus slave, or a bus master/slave interface of the present invention. Bus arbiter 210 includes address decoder 105 of FIG. 1.

Byte Alignment

Figure 18:
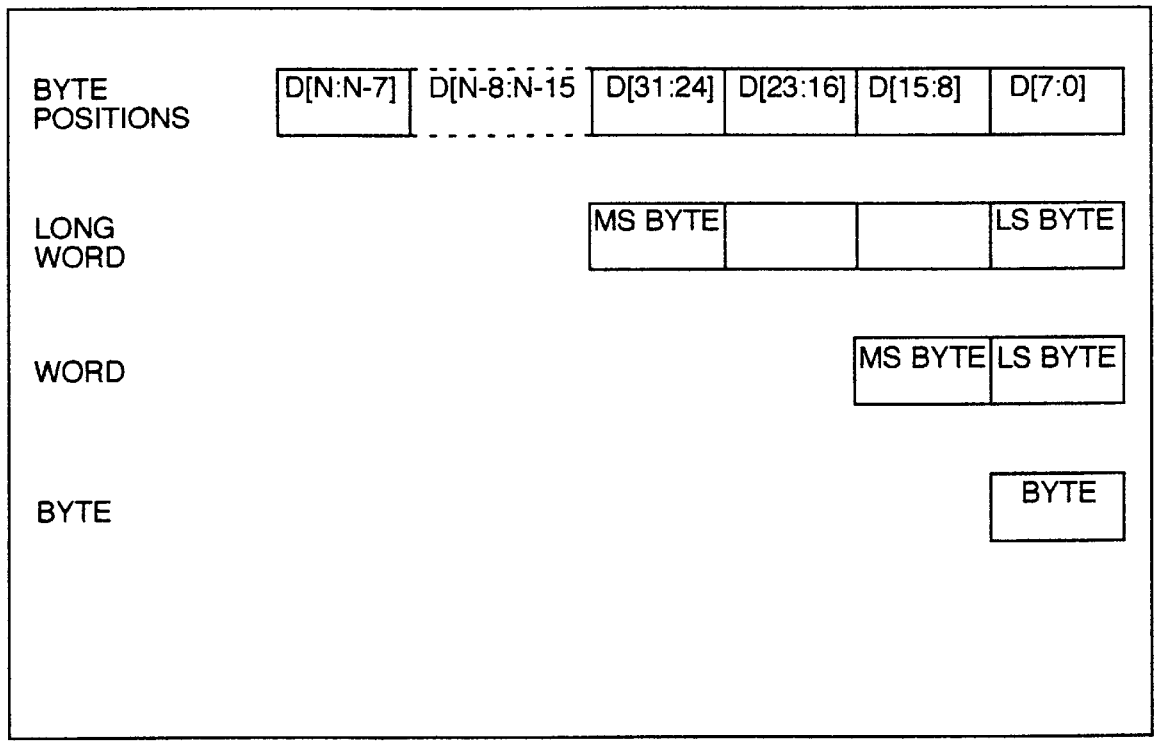
FIG. 18 illustrates data alignment for one embodiment of the present invention.

Referring now to FIG. 18, wherein a block diagram illustrating the byte alignment approach employed by one embodiment of the present invention is shown. As illustrated, the embodiment implements right aligned transfers of bytes, long words and words. The bottom data bits (7-0) are used for the least significant byte and the highest bits are used for the most significant byte. The right alignment approach removes the endian mode dependency from the functional blocks, allowing functional blocks with different minimum data width requirements to be easily interfaced. The required endian mode is handled in the corresponding processor personality functional blocks of the different processors. In alternate embodiments, a processor's natural byte orientation may be used instead. In such a situation, the alignment mode used should be clearly documented.

Arbitration

Figure 19A:
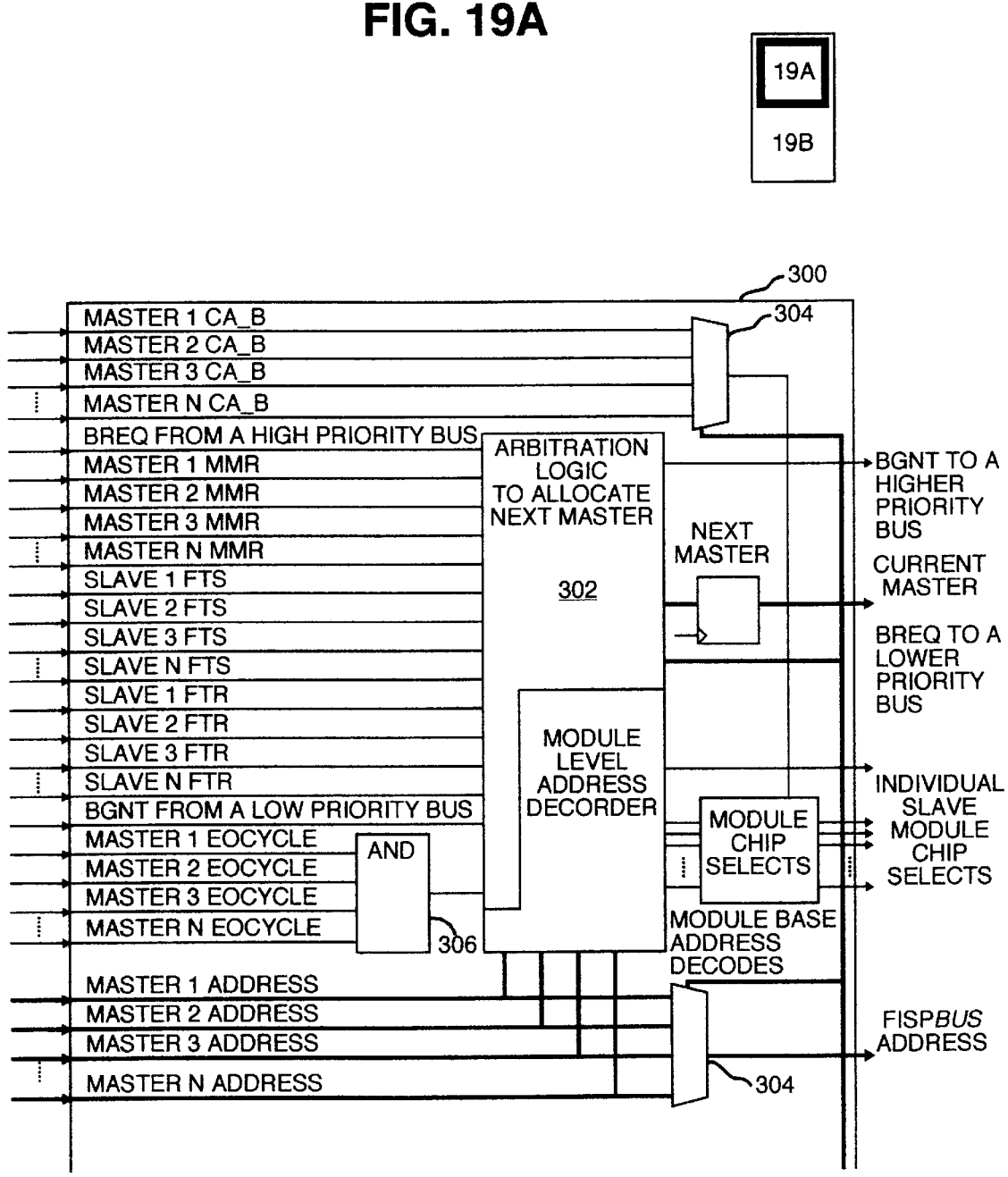
FIGS. 19–20 illustrate one embodiment of an arbitrator suitable for use with the present invention.
Figure 19B:
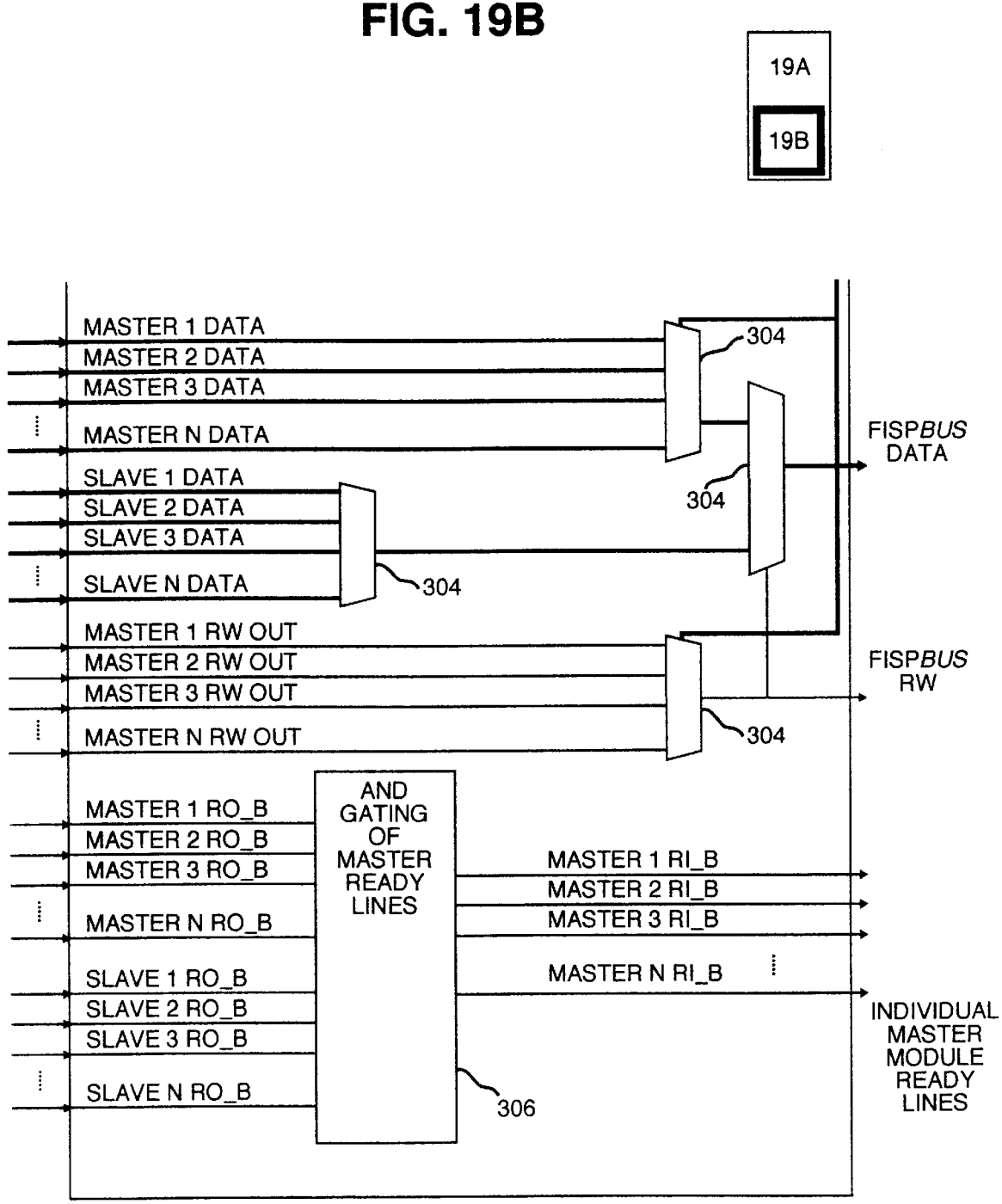
Figure 20:
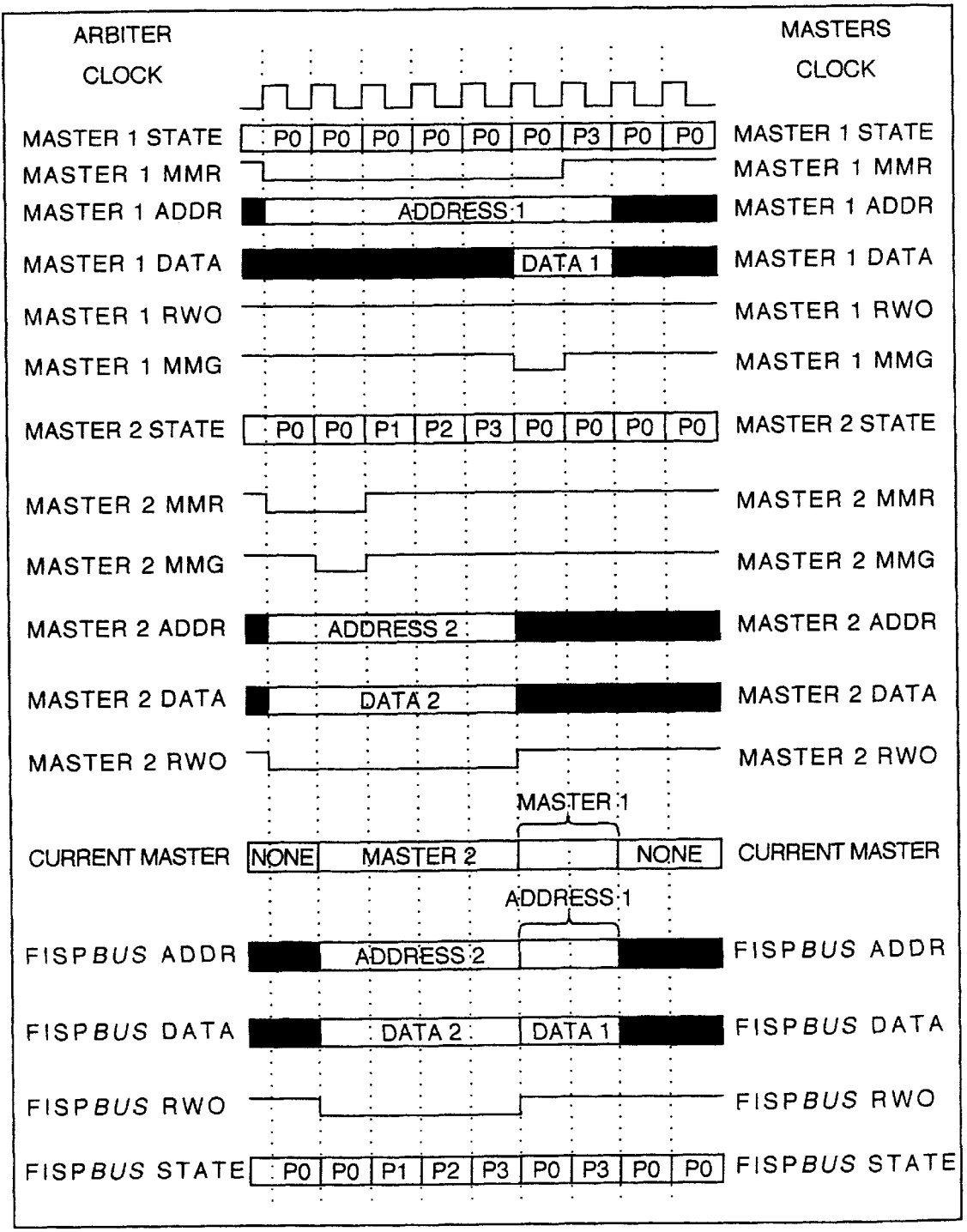

Referring now to FIGS. 19–20, wherein a block diagram and a waveform diagram illustrate one embodiment of an arbitrator suitable for use with the present invention are shown. As shown in FIG. 19, for the illustrated embodiment, arbitrator 300 includes arbitration logic 302, a number of multiplexors 304, and a number of AND logic 306. Arbitration logic 302 determines who's the current master. Multiplexors 304 select the appropriate chip select, address and data lines etc. AND logic 306 perform logical AND on the EOCycle and the RO_B signals.

The method used by arbitration logic 302 to determine the next master is application dependant, but all logic to determine the next master should be stable within one clock to guarantee that no cycles are lost due to the arbitration process. If this is not possible, the overall bus bandwidth will have to be reduced and the arbiter will have to use some additional clock cycles between bus accesses.

For the illustrated embodiment, the arbitration scheme works by the use of a minimum of two signals. Any master wanting to take bus ownership asserts its MMR signal and requests service from the arbiter. When the arbiter wants to give a master ownership of the bus, it does so by setting the appropriate grant (MMG) line. The MMG signal is used by the bus master to start an access on the bus. When the arbiter detects an end of cycle (EOCycle) from the bus master, it determines the next master and grants that master ownership of bus for the next access via the MMG line.

There are no specific rules as to how the arbiter determines the next master, and it is expected that each application will probably need a different implementation. Examples of previous types of arbitration schemes include priority based, round robin, demand driven and bursty. Various signals on the bus allow the arbiter to decide on the next master including the target addresses, slave FTS, FTR signals. In addition to support bursty transfers the arbiter can allow a single master to occupy contiguous access slots on the bus. In addition to master requests from the bus masters, the arbiter can also receive and send bus requests to and from other arbiter units on secondary buses allowing functional blocks to communicate between different buses via a bus bridge which allows direct connection between two buses under arbiter control.

For the illustrated embodiment, the arbiteration logic also include address decoding for generating the chip selects to each bus slave as well as address and data multiplexing to put the current master's information on the bus. The arbiter also generates the ready in lines for each of the masters by anding all the ready lines from the slave units.

The waveform diagram shows a fast Master (Master 1) and a normal 4 cycle master (Master 2) both requesting bus mastership from the arbiter. Master 2 is given first access and completes. The end of cycle signal from Master 2 enables the arbiter to choose Master 1 as the next master and bus ownership is then handed to Master 1. The arbitration is conducted during the previous cycles end of cycle period and therefore does not result in any additional clock cycles for bus arbitration. If additional time is taken to arbitrate the bus and the grant (MMG) is delayed additional idle (P0) states will be added.

Interrupt Handling

In one embodiment, the scalar processor independent bus of the present invention also supports both vectored and non vectored interrupts. The generation of the vector from an interrupt is the function of the appropriate microprocessor personality functional block. As described earlier, each functional block with a bus interface incorporated with the teachings of the present invention has two signals defined for interrupt support IG and IR. These signals are busses with the width matching the number of interrupts that are present in the functional block +1. The extra signal is bit 0 of the interrupt lines, and is defined as the AND of all the functional block interrupt requests (IR) or interrupt Grants (IG).

It is not mandatory for a functional block to fully support vectored interrupts. In this case bit 0 of the IR bus is driven and all other bits of the IR and IG are ignored. The documentation for the functional block should clearly state whether support for vectored interrupts is provided.

In a number of embodiments, support for vectored interrupts is provided in the microprocessor personality functional block (MPFB). The various IR buses from each functional block is fed back to the microprocessor personality functional block. Any interrupts requiring vector support are used to drive a vector look up table and the appropriate vector is returned to the microprocessor. When the acknowledgement is received from the microprocessor, the appropriate IG bit is driven to clear the interrupt down.

Asynchronous Interfacing

In one embodiment, the scalar processor independent bus is a fully synchronous on-chip bus system. However, when interfacing to microprocessors and designing systems it is inevitable that certain functional blocks will need to run asynchronously to the bus. The basic method is to generate a clean (i.e. reclocked) signal to drive the WAIT input to the bus interface state machine.

For example, in an asynchronous bus slave interface, some read and write registers will need to be in the bus slave's clock domain, while the bus slave interface is in the bus' clock domain. In such cases, the resultant read and write strobes can be extended for additional clocks with new circuitry, and then resynchronised to the bus slave's clock domain. Once this is complete, the resultant strobe signal should also be used to inhibit the extension of the bus cycle. All read data should be latched from the bus slave's clock domain into the bus' clock domain before any read cycles are terminated. By using the state code of the bus interface's state machine and the status of the extended strobes, the bus can be made to wait until the access is successfully completed. The WAIT pin is used to ensure that the bus access is extended until the synchronisation process is complete.

The WAIT input must be synchronous and if necessary has to be retimed to ensure that metastability conditions are handled correctly. The ability to add wait states to both the master and slave interfaces allows it to easily interface to asynchronous clock domains by simply extending the bus cycle as required.

Broadcast Write Accesses

In one embodiment, Broadcast accesses are implicitly supported through the arbitration mechanism. It is expected that the broadcast access facility will be used for specific registers or banks of bus masters/slaves all expected to be used in the same manner. Care must be taken in the design of the arbiter to ensure that the broadcast accesses are restricted to write accesses only.

If the bus is used in fast mode, the system designer must ensure that all the broadcast slaves are capable of 2 cycle access. In this mode, no wait or other support is provided for ensuring that the broadcast access has been successfully completed, and it relies on correct operation by virtue of the design. The ability of each slave to deassert the free to receive (FTR) line can provide additional information to the arbiter to ensure that all the relevant slaves are capable of taking the next broadcast access. When using the FTR line to control accesses, the length of contiguous accesses will be limited by the slave with the smallest buffer capacity (i.e. by the first slave to deassert FTR). Any bus slave location supporting fast accesses by default supports broadcast bursts writes, if this register also controls the FTR line.

The general operation of the 4+ cycle depends on the ready out (RO_B) and ready in (RL_B) lines to both the master and slave interfaces. In non broadcast accesses the ready in to the bus master is the ready out from the addressed slave. In broadcast accesses the ready in to the slaves is made by ANDING all the active low ready out lines from all addressed slaves as well as the ready out from the bus master. This would cause the period of any access cycle to be extended to accommodate the slowest slave. The bus master ready in is made by ANDING all the active low ready out lines from all the addressed slaves. In practice, this selective ANDING of the ready lines is undertaken in the arbiter unit.

Burst Mode Accesses

Burst Mode accesses can only be initiated by a bus master that supports Burst Mode accesses and Slave registers that support fast (2 cycle) accesses or Slave registers that support Burst Mode accesses. Any bus master/slave that supports burst mode transfers must explicitly define the registers that support this mode and the expected method of operation.

Burst mode accesses can only be used when addressing contiguous ascending address locations (i.e. N, N+1, N+2 . . . N+M) and while continuously reading or writing. Various parts of the interface control the length and operation of burst mode transfers. The length of the burst source can be any length and this is defined by the bus master. The length of burst that a slave can take is determined by the slave. The arbiter determines the length of the continuous burst that a particular master is allowed to have.

To facilitate the Burst Mode two additional control lines (BA_B—Burst Active and OK2B—OK to burst) are used. The BA_B signal is generated by a burst supporting master and the current masters BA_B signal is channelled to the slave. On the master and slave entities, the BA_B signal is usually represented as BAO_B for the master and the BAI_B for the slave. The OK2B signal is generated by the slave and provides indication to the bus arbiter that the slave can now sustain burst transfers. The BA_B line is used to signify that the current access is part of a burst transfer. This allows a burst mode compatible bus slave to get ready for the burst transfer. Generally, the slave will pre-fetch information or undertake certain tasks in preparation for the burst. The time available to undertake this is determined by the bus slave. However, once the first access is complete, the burst transfer protocol expects all other transfers to take place at a fast 2-cycle rate.

The basic bus operation is not changed during this mode but a higher level protocol is employed. The burst starts with a 4+ cycle access and all subsequent accesses from the bus master are in fast mode (2 cycles). The bus master asserts the active low Burst Active line (BAO_B) on its transition from state P0 to P1 and deasserts BAO_B after the final 2 cycle transfer during the state change from P3 to P0. At the slave end, the start and subsequent burst accesses are signalled by the BAI_B input line being active during P0. If the BAI_B is inactive during P3 of the bus slave, an end of burst sequence is signalled. A new burst transfer may then be signalled by the BAI_B being set again at P0, and a new 4+ cycle will start.

The bus slave can extend the first cycle by using the WAIT control and can terminate the burst transfers by signalling to the arbiter that the ability to receive or send data is over. This is facilitated by removing the OK to burst signal (OK2B). The arbiter allows a master to burst transfer by granting the master bus ownership for more than one access cycle. The bus master will start the transfer when it first gets the grant, and continues to burst until the master mode grant line (MMG) goes inactive or the bus master has completed the burst.

Figure 21:
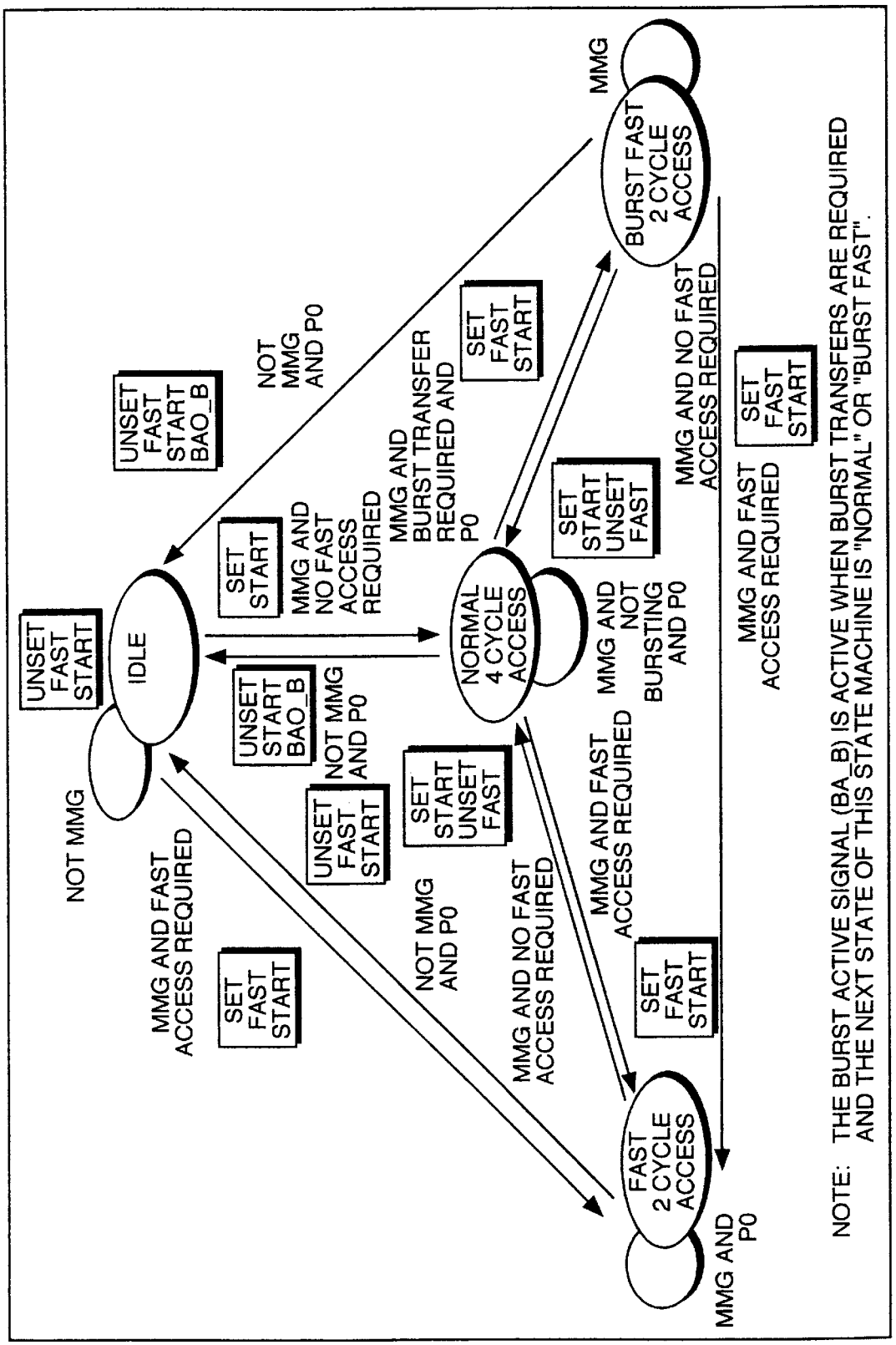
FIGS. 21–22 illustrate one embodiment of the manner in which burst mode transfer is supported.
Figure 22:
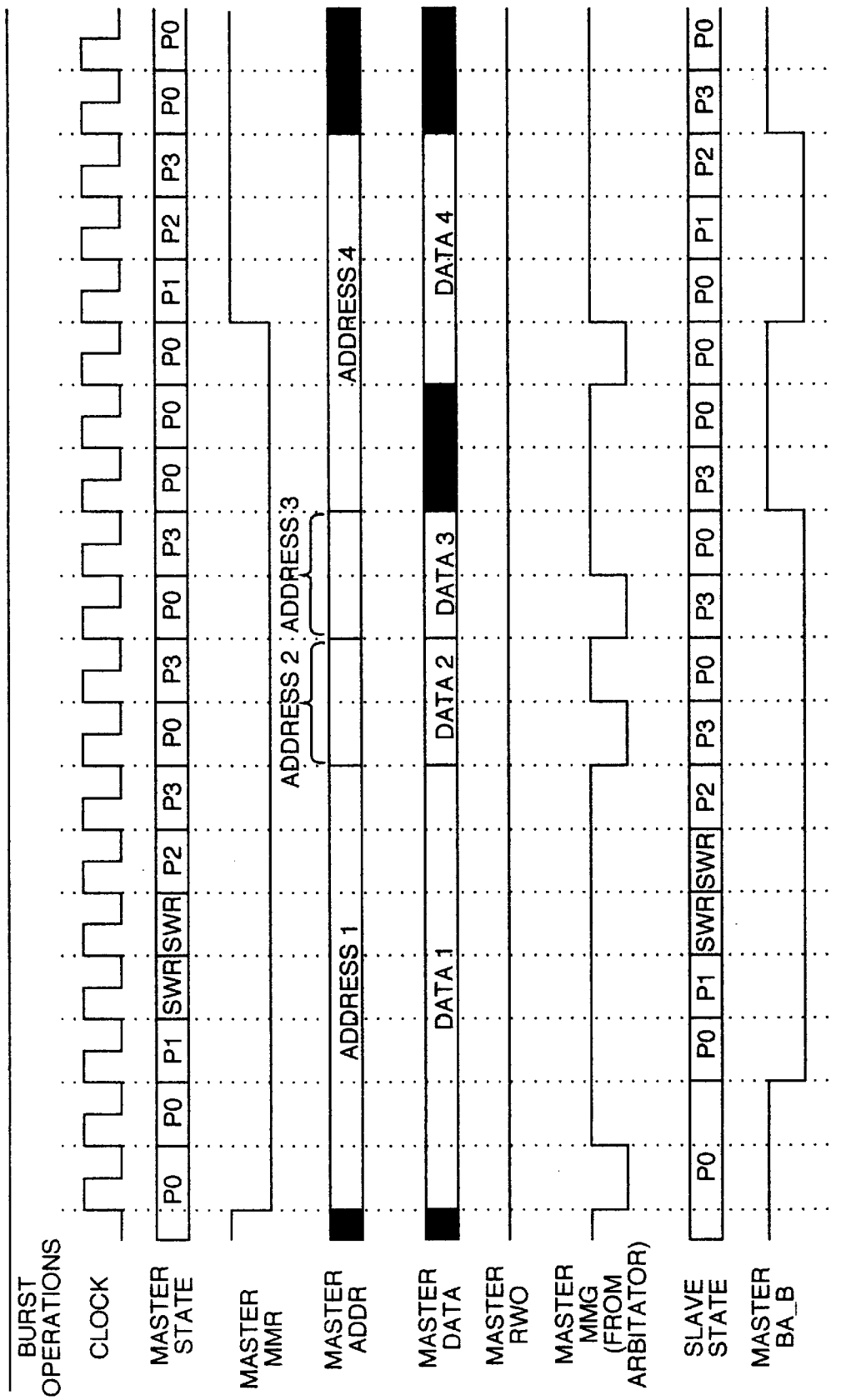

FIGS. 21–22 illustrate how the standard master mode control signals of the bus interface state machine are controlled in bus master interfaces that support the burst transfer mode. This state machine must be added to any bus master circuit that supports the burst transfer mode. On the bus slave interface, the bus slave has to examine the burst active input (BAI_B) line to determine if a burst transfer is occurring. Multiple bus masters are allowed to burst to the same slave by anding the BAO_B lines together and generating the final BA_B signal. The state machine described above ensures that between burst transfers the BA_B line will be inactive during master state P0. The bus slave examines the initial burst status during its P0, but will examine the continuing burst status during its state P3.

Tristate Architectures

So far, the present invention has been described as using multiplexers and separate data in and data out lines. This is preferred as it allows the bus master/slave interfaces to be used on any ASIC process. However, there are sometimes system requirements for using a tristate bus.

The structure of the present invention has ensured that the bus direction control is concentrated in the arbiter. In the descriptions presented, the direction control is provided by multiplexers. In a tristate implementation tristate drivers will need to be added to the data lines and the master address lines. The arbiter will then have to be modified to generate appropriate control signals to control these signals. In addition, the ready out lines (RO_B) and burst active (BA_B) lines can also be made tristate. Care must be taken to ensure that when no bus master is active, the bus lines are driven to inactive or default states (as appropriate).

Error Control

In systems where all the addresses are not fully decoded there is a possibility for the bus to access a non existent peripheral and hang, waiting for a ready that never arrives. In one embodiment, a watchdog timer (the length of which is determined by the application) is added to the system to reset the bus if this situation arises. In another embodiment, all addresses are ensured to be always fully decoded, and the bus slaves exist at all addresses.

Figure 23:
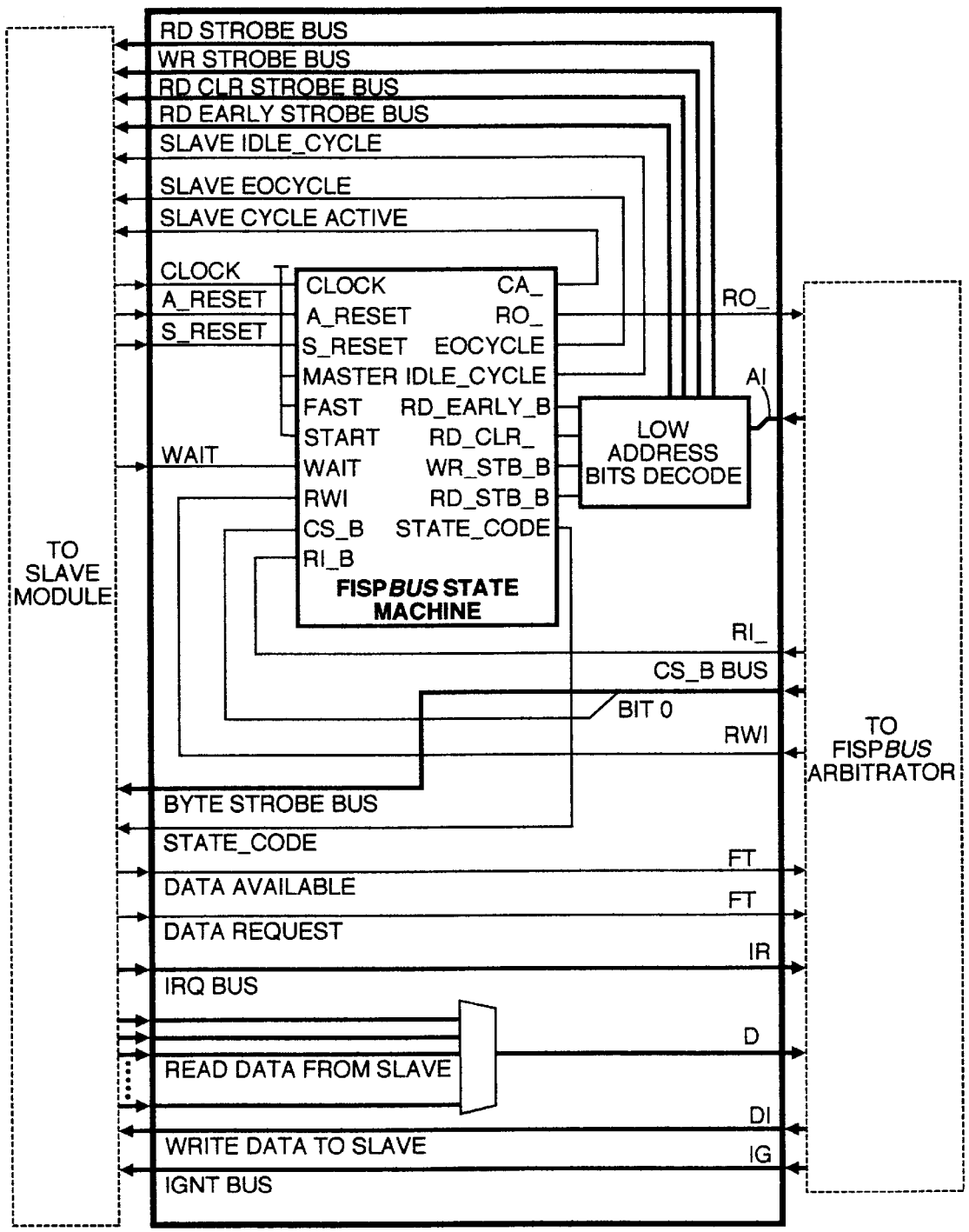
FIG. 23–25 illustrate one embodiment each of a bus master, a bus slave, and a bus master/slave interface.
Figure 24:
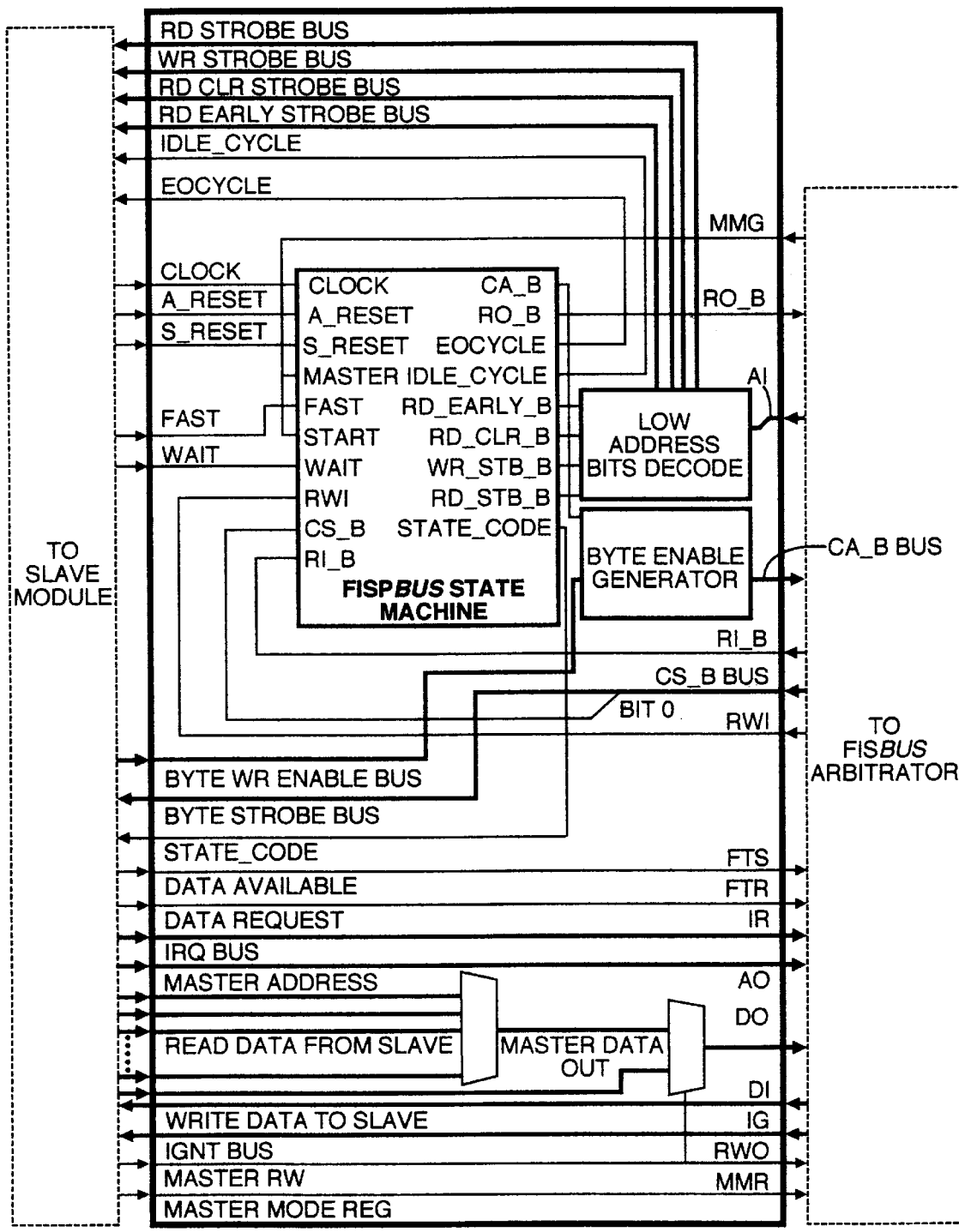
Figure 25:
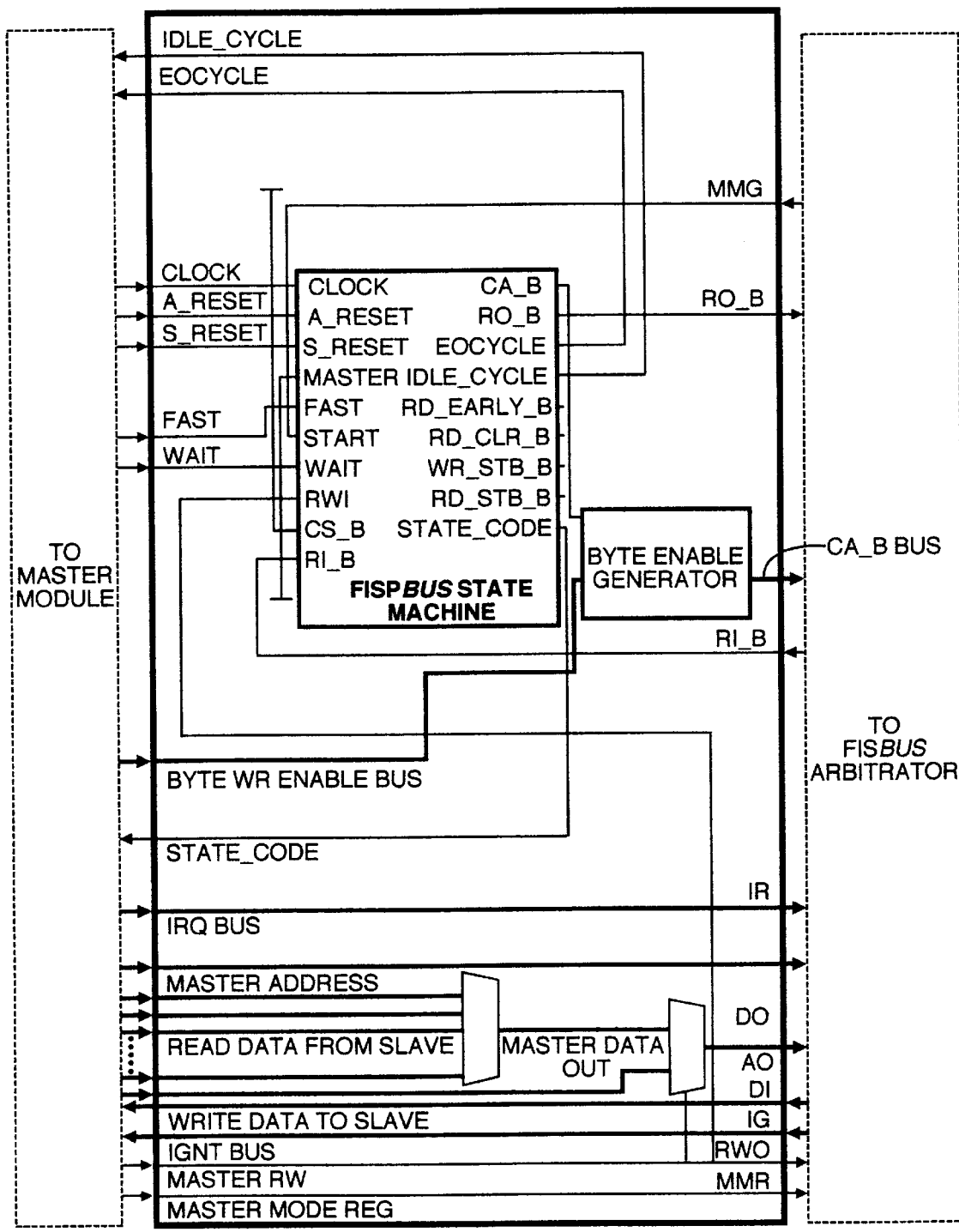

Finally, FIG. 23–25 illustrate one embodiment each of a bus master, a bus slave, and a bus master/slave interface. Shown in FIG. 23 is an exemplary bus slave module. As mentioned previously the bus master and slave state machines are implemented using the same logic. The Master, Fast and Start control signals on this machine are only used during the master mode and are therefore tied off to an active high value when used in a bus slave. FIG. 24 illustrated the structure of a combined bus master and slave interface. The additional signals required to support bus master interfaces were described earlier. Lastly, FIG. 25 the host and bus connections that are required to implement a bus master interface. The bus master has some additional control signals for control of the bus arbitration process.

Thus, a scalable processor independent on-chip bus has been described. While the method and apparatus of the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. An integrated circuit comprising a bus, a first bus master function block coupled to the bus, and a slave function block also coupled to the bus, the first bus master function block having a bus master interface including a state machine that conducts a bus transaction between the first bus master function block and the bus slave function block in either a two state fast mode of operation, or an at least four state normal mode of operation, wherein the at least four states of the at least four state normal mode of operation includes the two states of the two state fast mode of operation.

2. The integrated circuit of claim 1, wherein the at least four state normal mode of operation comprises an idle state, a wait/readiness determination state, a ready state and an end of cycle state, and the two state fast mode of operation consists the idle state and the end of cycle state.

3. The integrated circuit of claim 2, wherein the at least four state normal mode of operation further comprises one or more of a slave waiting on read (SWRD) state, a master waiting on read (MWRD) state, a master waiting on write (MWWR) state and a slave waiting on write (SWWR) state.

4. The integrated circuit of claim 2, wherein the state machine includes transition logic for transitioning the bus master interface from the idle state to the wait/readiness determination state if a mode signal denotes the at least four state normal mode of operation, otherwise, to the end of cycle state.

5. The integrated circuit of claim 4, wherein the state machine further includes transition logic for automatically transitioning the bus master interface from the end of cycle state to the idle state after one clock cycle.

6. The integrated circuit of claim 4, wherein the state machine further includes transition logic for transitioning the bus master interface from the wait/readiness determination state to a slave waiting on read (SWRD) state if the slave function block is not ready and the bus transaction is a read operation.

7. The integrated circuit of claim 4, wherein the state machine further includes transition logic for transitioning the bus master interface from the wait/readiness determination state to a master waiting on write (MWWR) state if the first master function block is not ready and the bus transaction is a write operation.

8. The integrated circuit of claim 4, wherein the state machine further includes transition logic for transitioning the bus master interface from the wait/readiness determination state to a slave waiting on write (SWWR) state if the slave function block is not ready and the bus transaction is a write operation.

9. The integrated circuit of claim 4, wherein the state machine further includes transition logic for transitioning the bus master interface from the wait/readiness determination state to a master waiting on read (MWRD) state if the first master function block is not ready and the bus transaction is a read operation.

10. The integrated circuit of claim 4, wherein the state machine further includes transition logic for transitioning the bus master interface from either the wait/readiness determination state, a slave waiting on read (SWRD) state, a master waiting on write (MWWR) state, a slave waiting on write (SWWR) state, or master waiting on read (MWRD) state to the ready state if either no waiting is required or required waiting has occurred.

11. The integrated circuit of claim 1, wherein the integrated circuit further includes a second bus master function block also coupled to the bus and having a like bus master interface, and an arbitration unit also coupled to the bus for arbitrating access to the bus between the first and second master function block.

12. The integrated circuit of claim 1, wherein the first bus master function block is a microprocessor personality block, and the integrated circuit further includes a microprocessor coupled to the first master function block.

13. The integrated circuit of claim 1, wherein the bus master interface is further equipped to burst transfer data to the slave function block.

14. An integrated circuit comprising a bus, a first bus master function block coupled to the bus, and a bus slave function block also coupled to the bus, the bus slave function block having a bus slave interface including a state machine that conducts a bus transaction between the first bus master function block and the bus slave function block in either a two state fast mode of operation, or an at least four state normal mode of operation, wherein the four states of the at least four state normal mode of operation includes the two states of the two state fast mode of operation.

15. The integrated circuit of claim 14, wherein the at least four state normal mode of operation comprises an idle state, a wait/readiness determination state, a ready state and an end of cycle state, and the two state fast mode of operation consists the idle state and the end of cycle state.

16. The integrated circuit of claim 15, wherein the at least four state normal mode of operation further comprises one or more of a slave waiting on read (SWRD) state, a master waiting on read (MWRD) state, a master waiting on write (MWWR) state and a slave waiting on write (SWWR) state.

17. The integrated circuit of claim 15, wherein the state machine includes transition logic for transitioning the bus slave interface from the idle state to the wait/readiness determination state if a mode signal denotes the at least four state normal mode of operation, otherwise, to the end of cycle state.

18. The integrated circuit of claim 17, wherein the state machine further includes transition logic for automatically transitioning the bus slave interface from the end of cycle state to the idle state after one clock cycle.

19. The integrated circuit of claim 17, wherein the state machine further includes transition logic for transitioning the bus slave interface from the wait/readiness determination state to a slave waiting on read (SWRD) state if the slave function block is not ready and the bus transaction is a read operation.

20. The integrated circuit of claim 17, wherein the state machine further includes transition logic for transitioning the bus slave interface from the wait/readiness determination state to a master waiting on write (MWWR) state if the first master function block is not ready and the bus transaction is a write operation.

21. The integrated circuit of claim 17, wherein the state machine further includes transition logic for transitioning the bus slave interface from the wait/readiness determination state to a slave waiting on write (SWWR) state if the slave function block is not ready and the bus transaction is a write operation.

22. The integrated circuit of claim 17, wherein the state machine further includes transition logic for transitioning the bus master interface from the wait/readiness determination state to a master waiting on read (MWRD) state if the first master function block is not ready and the bus transaction is a read operation.

23. The integrated circuit of claim 17, wherein the state machine further includes transition logic for transitioning the bus slave interface from either the wait/readiness determination state, a slave waiting on read (SWRD) state, a master waiting on write (MWWR) state, a slave waiting on write (SWWR) state, or master waiting on read (MWRD) state to the ready state if either no waiting is required or required waiting has occurred.

24. The integrated circuit of claim 14, wherein the integrated circuit further includes a second bus master function block also coupled to the bus, and an arbitration unit also coupled to the bus for arbitrating access to the bus between the first and second master function blocks.

25. The integrated circuit of claim 14, wherein the first bus master function block is a microprocessor personality block, and the integrated circuit further includes a microprocessor coupled to the first master function block.

26. The integrated circuit of claim 14, wherein the bus slave interface is further equipped to receive burst transferred data from the first master function block.

27. An integrated circuit comprising a bus, a bus master/slave function block coupled to the bus, and either a bus master or a bus slave function block also coupled to the bus, the bus master/slave function block having a bus master/slave interface including a state machine that conducts a bus transaction with the bus master or slave function block as a bus master if the bus master or slave function block is a bus slave function block or as a bus slave if the bus master or slave function block is a bus master function block, the bus transaction being conducted in either a two state fast mode of operation, or an at least four state normal mode of operation, wherein the four states of the at least four state normal mode of operation includes the two states of the two state fast mode of operation.

28. The integrated circuit of claim 27, wherein the at least four state normal mode of operation comprises an idle state, a wait/readiness determination state, a ready state and an end of cycle state, and the two state fast mode of operation consists the idle state and the end of cycle state.

29. The integrated circuit of claim 28, wherein the at least four state normal mode of operation further comprises one or more of a slave waiting on read (SWRD) state, a master waiting on read (MWRD) state, a master waiting on write (MWWR) state and a slave waiting on write (SWWR) state.

30. An integrated circuit comprising:
   a bus;
   a bus master function block coupled to the bus, the bus master function block having a bus master interface including a state machine that implements a two state fast mode of operation, and a at least four state normal mode of operation, wherein the four states of the at least four state normal mode of operation includes the two states of the two state fast mode of operation; and
   a bus slave function block coupled to the bus, the bus slave function block having a bus slave interface including a state machine that implements in a complementary manner the two state fast mode of bus operation, and the at least four state normal mode of operation.

31. The integrated circuit of 30; wherein the integrated circuit further includes a bus master/slave function block coupled to the bus, the bus master/slave function block having a bus master/slave interface including a state machine that implements in a complementary manner the two state fast mode of operation, and the at least four state normal mode of operation.

32. The integrated circuit of 30; wherein the integrated circuit further includes another bus master function block coupled to the bus, the other bus master function also having a bus master interface including a state machine that implements the two state fast mode of bus operation, and the at least four state normal mode of operation; and
   an arbiter coupled to the bus for arbitrating bus accesses for the bus master function blocks.

* * * * *